(12) United States Patent
Omundson et al.

(10) Patent No.: US 12,196,160 B2
(45) Date of Patent: Jan. 14, 2025

(54) LIQUID INJECTED PROPANE FUEL SYSTEM

(71) Applicant: Auto Gas Services, LLC, Markesan, WI (US)

(72) Inventors: John Patrick Omundson, Riverside, CA (US); Carl D. Wegner, Markesan, WI (US)

(73) Assignee: AUTO GAS SERVICES, LLC, Markesan, WI (US)

( * ) Notice: Subject to any disclaimer, the term of this patent is extended or adjusted under 35 U.S.C. 154(b) by 577 days.

(21) Appl. No.: 16/383,198

(22) Filed: Apr. 12, 2019

(65) Prior Publication Data
US 2020/0325855 A1 Oct. 15, 2020

(51) Int. Cl.
*F02M 21/02* (2006.01)

(52) U.S. Cl.
CPC .... *F02M 21/0287* (2013.01); *F02M 21/0245* (2013.01); *F02M 21/0257* (2013.01); *F02M 21/0281* (2013.01)

(58) Field of Classification Search
CPC ........... F02M 21/0287; F02M 21/0245; F02M 21/0257; F02M 21/0281
USPC ....................................................... 123/525
See application file for complete search history.

(56) References Cited

U.S. PATENT DOCUMENTS

| | | | |
|---|---|---|---|
| 3,014,623 A * | 12/1961 | Horn ..................... | F04D 29/606 415/203 |
| 3,039,699 A | 6/1962 | Allen | |
| 4,556,037 A | 12/1985 | Wisdom | |
| 4,569,637 A * | 2/1986 | Tuckey .................. | F02M 37/08 417/435 |
| 4,570,602 A | 2/1986 | Atkins et al. | |
| 4,672,937 A * | 6/1987 | Fales ...................... | F02M 37/18 123/495 |
| 4,747,384 A | 5/1988 | Hafner et al. | |
| 4,776,315 A * | 10/1988 | Greiner ................. | B60K 15/06 417/40 |
| 4,926,829 A | 5/1990 | Tuckey | |
| 5,033,444 A * | 7/1991 | Kaufman ................ | F02B 43/00 123/527 |

(Continued)

FOREIGN PATENT DOCUMENTS

| | | | | |
|---|---|---|---|---|
| GB | 2014336 A | * | 8/1979 | ....... F02M 35/02483 |
| JP | H0828382 | | 1/1996 | |

(Continued)

*Primary Examiner* — Lindsay M Low
*Assistant Examiner* — Anthony Donald Taylor, Jr.
(74) *Attorney, Agent, or Firm* — RYAN KROMHOLZ & MANION, S.C.

(57) ABSTRACT

A system according to the present invention provides for a liquid injected propane fuel system for internal combustion engines which provides for a fuel pump assembly, a base tank valve adaptor, a distribution assembly, and rail assemblies; a first embodiment of the liquid injected propane fuel system may provide for proportional fuel injection, a second embodiment may provide for direct fuel injection providing for at least substantial reduction in evaporation (EVAP) emissions, is disclosed, a third embodiment of the liquid injected propane fuel system may provide for a combination of proportional fuel injection and direct fuel injection; the invention comprising at least one of a fuel tank, an external fuel tank, a distribution block, a fuel rail and a ECU.

3 Claims, 15 Drawing Sheets

(56) References Cited

U.S. PATENT DOCUMENTS

| | | | |
|---|---|---|---|
| 5,088,467 A | 2/1992 | Mesenich | |
| 5,150,691 A | 9/1992 | Imajo | |
| 5,245,972 A | 9/1993 | Denz et al. | |
| 5,291,869 A | 3/1994 | Bennett | |
| 5,377,645 A | 1/1995 | Moore | |
| 5,408,978 A | 4/1995 | Davis | |
| 5,423,303 A | 6/1995 | Bennett | |
| 5,433,182 A | 7/1995 | Augustin et al. | |
| 5,479,906 A * | 1/1996 | Collie | F02D 19/027 |
| | | | 123/525 |
| 5,623,907 A * | 4/1997 | Cotton | F02M 37/10 |
| | | | 123/456 |
| 5,762,049 A * | 6/1998 | Jones | F02M 37/10 |
| | | | 123/509 |
| 5,791,304 A | 8/1998 | Taipale | |
| 5,848,583 A | 12/1998 | Smith et al. | |
| 5,881,699 A * | 3/1999 | Brown | F02M 37/0082 |
| | | | 123/514 |
| 5,967,126 A | 10/1999 | Ofner | |
| 6,003,495 A | 12/1999 | Tipton et al. | |
| 6,176,260 B1 * | 1/2001 | Hahner | B60K 15/077 |
| | | | 123/468 |
| 6,192,918 B1 * | 2/2001 | Jaasma | F02M 37/103 |
| | | | 137/565.34 |
| 6,220,779 B1 | 4/2001 | Warner et al. | |
| 6,250,290 B1 | 6/2001 | Mullen | |
| 6,314,947 B1 | 11/2001 | Roche | |
| 6,341,597 B1 | 1/2002 | Cohen | |
| 6,668,804 B2 | 12/2003 | Dobryden et al. | |
| 6,675,778 B1 * | 1/2004 | Kemper | F02M 37/103 |
| | | | 123/509 |
| 6,729,308 B1 * | 5/2004 | Kanamaru | B01D 29/111 |
| | | | 123/510 |
| 6,783,336 B2 * | 8/2004 | Kempfer | H01R 13/5202 |
| | | | 417/423.1 |
| 6,955,156 B2 * | 10/2005 | Noda | F02M 53/00 |
| | | | 123/364 |
| 7,073,525 B2 * | 7/2006 | Chung | F02M 37/106 |
| | | | 137/571 |
| 7,293,551 B2 * | 11/2007 | Nozaki | F02M 21/0236 |
| | | | 123/514 |
| 7,305,968 B2 | 12/2007 | Ricco et al. | |
| 7,677,225 B2 * | 3/2010 | Radue | F02M 37/007 |
| | | | 123/509 |
| 7,822,534 B2 | 10/2010 | Matsubara | |
| 8,245,695 B2 * | 8/2012 | Martin | F02D 19/0694 |
| | | | 123/447 |
| 8,905,070 B2 * | 12/2014 | Beem | F17C 13/04 |
| | | | 137/574 |
| 9,139,083 B2 * | 9/2015 | Song | B60K 15/03 |
| 9,200,598 B2 * | 12/2015 | Cippitani | F02M 21/0245 |
| 2003/0068239 A1 | 4/2003 | Suzuki | |
| 2003/0216883 A1 | 11/2003 | Lee | |
| 2005/0145223 A1 * | 7/2005 | Nozaki | F02M 21/0245 |
| | | | 123/516 |
| 2005/0235948 A1 * | 10/2005 | Hayasaka | F02D 19/027 |
| | | | 123/255 |
| 2006/0016433 A1 | 1/2006 | Treusch | |
| 2007/0044769 A1 | 3/2007 | Kim | |
| 2009/0123310 A1 * | 5/2009 | Kim | F02M 21/0212 |
| | | | 417/423.1 |
| 2010/0307614 A1 * | 12/2010 | Basaglia | F02M 21/0221 |
| | | | 137/565.11 |

FOREIGN PATENT DOCUMENTS

| | | | |
|---|---|---|---|
| WO | WO1989/000640 | 1/1989 | |
| WO | WO8900640 A1 * | 1/1989 | F02D 19/027 |

* cited by examiner

LIQUID INJECTED PROPANE FUEL SYSTEM

BACKGROUND OF THE INVENTION

The present invention is directed to internal combustion engines. More specifically the present invention is directed to a liquid injected propane fuel systems for internal combustion engines. More specifically the present invention is directed to a liquid injected propane fuel systems for internal combustion engines which provides for a fuel pump assembly, a base tank valve adaptor, a distribution assembly, and rail assemblies.

Propane fuel in liquid form (LP) is a widely used alternative to gasoline with nearly 200,000 on-road propane vehicles with certified systems in the United States, according to the Propane Education & Research Council and provided by the U.S. Department of Energy, Alternative Fuels Data Center. The propane industry started in 1910 with the discoveries by Dr. Walter O. Snelling investigation of vapors coming from the fuel tank of a newly purchased Ford Model T. The first propane vehicle ran in 1913.

Prior art propane delivery systems comprise a fuel tank in fluid communication with a fuel rail system. The fuel may be advanced to the fuel rail system through the use of a pump, located internally within the fuel tank or external from the fuel tank. The prior art propane delivery systems may be open looped, where the fuel travels from the fuel tank to the fuel rail assemblies. Alternatively, the prior art propane delivery systems may be closed looped, where a second end of the fuel rail system is in communication with the fuel tank to provide for return of propane to the fuel tank.

Prior art propane delivery systems are categorized as vapor delivery systems and liquid delivery systems. The vapor delivery systems of the prior art lack the fuel flow requirements needed for large displacement internal combustion engines, resulting in a lack of performance and economy. The prior art does provide for liquid delivery systems for propane. However, the liquid delivery systems of the prior art have experienced issues with the fact that liquid propane boils or evaporates liquid propane at a low temperature at normal pressure (for example propane begins to boil at sea level at −44° F.). Thus, the liquid delivery systems of the prior art have experienced evaporation loss (EVAP emissions) of the liquid propane, due to the inherent properties of propane, prior to disbursement of the propane into the combustion chamber(s) of an engine.

The prior art as illustrated in In re Kaufmann (U.S. Pat. No. 5,033,444) and In re Bennett (U.S. Pat. No. 5,291,869) discloses a cooling system to maintain the liquid fuel within the propane delivery systems, Butane in the case of Kaufmann, below the boiling temperature prior to supplying the fuel to the injection system. Kaufmann attempts to apply a cooling system to address the EVAP emissions of the propane. However, application of a cooling system requires the combination of both the fuel delivery system and a separate cooling system. The combination of two separate systems provides for the increased possibility of system failure and, thus, EVAP emissions. It is apparent a need exists for the distribution of liquid propane in a singular system in order to reduce the possibility of system failure and resulting EVAP emissions.

The prior art propane fuel delivery systems teach distribution of the fuel to an engine assembly. However, the prior art propane fuel delivery systems do not teach distribution of at least one of a proportional injection system and a direct injection system through a singular distribution assembly wherein the distribution assembly is equipped to monitor the temperature and/or pressure of the fuel advancing through the distribution assembly.

The prior art propane delivery systems do teach fuel rails. However, the prior art systems as disclosed require a delayed purging of the system upon turning on the engine system via the ignition switch. In the prior art systems the fuel remaining in the system external of the fuel tank is subjected to evaporation, EVAP emissions, including the fuel rails. The purging of the EVAP emissions through the fuel system, including the fuel rails, results in a delayed ignition time. Though the delayed ignition time may be seconds, the U.S. Department of Energy notes many of the vehicles having certified propane fuel systems are used in fleet applications, such as delivery services. The continual delay in starting the vehicle between delivery stops subsequently causes and then increases delays between deliveries. Thus, the prior art systems do not teach advancement of liquid propane fuel and EVAP emissions of propane through the propane delivery system in order to reduce the start time of the engine upon ignition.

The prior art propane delivery systems provide for pumps within the fuel tank (internal pumps) for the advancement of the fuel within the system. However, the prior art propane delivery systems do not teach a fuel pump which is accessible for maintenance without removing the fuel from the tank. Further, the lines servicing the fuel tank require discharging, removing of the fuel, before servicing the tank. The need to remove the fuel from the tank, increases maintenance time on the vehicle. As stated previously, many propane vehicles are within delivery fleets wherein down time is of the essence. It is observed prior art propane vehicles experience turn around maintenance time issues at present due to the required removal of the fuel tank for servicing.

In light of the prior art and the deficiencies observed within the prior art:

A need exists for a propane delivery system comprising a singular system for the distribution of liquid propane in order to reduce the possibility of system failure and resulting EVAP emissions.

A need exists for a propane fuel delivery system for distributing at least one of a proportional injection system and a direct injection system through a singular distribution assembly wherein the distribution assembly is equipped to monitor the temperature and/or pressure of the fuel advancing through the distribution assembly.

A need exists for a propane delivery system advancing liquid propane fuel and EVAP emissions of propane through the propane delivery system in order to reduce the start time of the engine upon ignition.

A need exists for the propane delivery system having a fuel pump which is accessible for maintenance without removing the fuel from the system and used to transfer fuel to and from remote tanks for servicing of remote tanks.

SUMMARY OF THE INVENTION

The present invention is directed to internal combustion engines. More specifically the present invention is directed to a liquid injected propane fuel systems for internal combustion engines. More specifically the present invention is directed to a liquid injected propane fuel systems for internal combustion engines which provides for a fuel pump assembly, a base tank valve adaptor, a distribution assembly, and rail assemblies.

A fuel system first embodiment may be a proportional fuel injection system. The fuel system first embodiment may comprise a fuel tank, at least one fuel filter, a distribution block, at least one fuel rail, at least one fuel out line, and at least one fuel return line. It is understood the fuel system first embodiment may comprise a single or multiple aspects of each at referenced component for which the fuel system first embodiment comprises. The fuel tank, fuel filter, distribution block, and at least one fuel rail of the fuel system first embodiment may be in fluid communication through the application of at least one fuel out line and at least one fuel return line. It is understood at least one aspect of at least one of a fuel system second embodiment and a fuel system third embodiment may be in cooperation with at least one aspect of the fuel system first embodiment.

A fuel system second embodiment may be a direct fuel injection system. The fuel system second embodiment may comprise a fuel tank, at least one fuel filter, a distribution block, and at least one fuel out line. It is understood the fuel system second embodiment may comprise a single or multiple aspects of each at referenced component for which the fuel system second embodiment comprises. The fuel tank, fuel filter, and distribution block of the fuel system second embodiment may be in fluid communication through the application of at least one fuel out line. It is understood at least one aspect of at least one of the fuel system first embodiment and a fuel system third embodiment may be in cooperation with at least one aspect of the fuel system second embodiment. Direct fuel injection as described in the invention provides for at least substantial reduction in evaporation (EVAP) emissions. An intended benefit of this invention is to provide an invention for a propane delivery system comprising a singular system for the distribution of liquid propane in in order to reduce the possibility of system failure and resulting EVAP emissions.

A fuel system third embodiment may comprise both the proportional fuel injection system as previously described and the direct fuel injection system as previous described. The distribution block may provide for distribution of fuel for the proportional fuel injection system as previous described and the direct fuel injection system as previous described. It is understood at least one aspect of at least one of a fuel system second embodiment and a fuel system third embodiment may be in cooperation with at least one aspect of the fuel system first embodiment.

Each of the above described embodiments incorporates a control circuitry in communication with at least one of the components of the system. Wherein the control circuitry provides for monitoring of fuel conditions and control of components for the advancement of fuel through the system.

The fuel tank may provide for a mounting assembly. The mounting assembly may comprise at least one fill port, a liquid level gauge port, a service valve port, a spitter valve port, a pressure relief valve port, a liquid port, and a base tank valve adaptor (BTVA) port.

A BTVA may be inserted into the BTVA port. The BTVA may comprise three ports. At least one port is a supply line. A first end of the supply line maybe in fluid communication with a pump. At least one return port may provide for a return line. At least one third port may provide for electrical leads. In a second embodiment of the BTVA the pump may be contained within a housing in communication with a BTVA first side, wherein the BTVA first side is facing an internal cavity of the fuel tank. The second embodiment of the BTVA provides for ease of maintenance on the pump. It is understood that at least one aspect of the first embodiment of the BTVA may be in cooperation with at least one element of the second embodiment of the BTVA.

Alternatively, the pump may be provided in a housing external from the fuel tank. The housing is in fluid communication with and between the fuel tank and the distribution block. It is understood that at least one of the first embodiment of the BTVA with the pump and the second embodiment of the BTVA with the pump is in sealable communication with a housing lower portion to comprise the housing. The housing external from the fuel tank provides for ease of maintenance of the pump and a filter pickup.

In a direct injection system, an external pump assembly for a liquid injected propane fuel system may comprising: a cylinder and a base tank valve adaptor; the cylinder having a second end and an internal cylinder wall, wherein the internal cylinder wall defines a cavity of the cylinder; a pump positioned within the cavity; the second end providing for an opening, wherein the opening is defined by a finality; the base tank valve adaptor having a first seal and a second seal; and at least one of the first seal and the second seal in sealable and removable communication with the second end, allowing for removal of the pump and the filter pickup.

A bore extending thru said internal cylinder wall allowing for removable communication with a fuel line. The base tank valve adaptor in removable communication with the pump, wherein a fuel may be transferred from the cavity to an external environment. The base tank valve adaptor having an overflow valve wherein the fuel, not transferred to an external environment, may be returned to the tank minimizing a fuel vapor. The first seal in sealable and removable communication with the finality. The second seal in sealable and removable communication with the internal cylinder wall. The external pump assembly in liquid communication with a propane tank.

An intended benefit of the invention is to provide for the propane delivery system having a fuel pump which is accessible for maintenance without removing the fuel from the system and used to transfer fuel to and from remote tanks for servicing of remote tanks. It is observed tanks may be on a separate vehicle.

The distribution block may provide for at least one port. The at least one port may accommodate at least one of port fuel injection and direct fuel injection. The at least one port may provide for communication with at least one of at least one temperature sensor and at least one pressure sensor. An intended benefit of the invention is to provide a propane fuel delivery system for distributing at least one of a proportional injection system and a direct injection system through a singular distribution assembly wherein the distribution assembly is equipped to monitor the temperature and/or pressure of the fuel advancing through the distribution assembly.

A distribution block for a liquid injected propane fuel system may comprise: a first member and a second member in communication; at least one of the first member and the second member having a first side and an oppositely opposed second side separated by at least one member body side; at least one of the first member and the second member having at least one bore extending into at least one of the first side, the second side, and the at least one member body side; and at least one of the first member and the second member having a body bore in communication with the at least one bore, wherein a fuel travels between the body bore and the at least one bore.

At least one of the first member and the second member having one bore extending into at least one of the first side and the second side. At least one of the first member and the second member having three bores extending into said member body side. A second first member bore, wherein the fuel enters the first member thru the at least one bore of the first member and proceeds to a second first member bore thru the member body bore. A first second member bore, wherein the fuel enters the second member thru the first second member bore and proceeds to the at least one bore of the second member thru said member body bore. A test bore in communication with the body bore of the first member, wherein the test bore provides for a field testing of a system pressure and purge oxygen from the system during service.

The system may comprise the fuel rails. The fuel rails may comprise an inlet port and an outlet port extending a length of the fuel rails. The inlet port and outlet port may be separated by a specified distance (d) along the length of the fuel rails. The fuel rails further comprise at least one fuel injector port along the length of the fuel injectors, wherein each of the inlet port and the outlet port intersect at least one of the fuel injector port. The communication of the inlet port, at least one fuel injector port, and the outlet port provides for a vortex path of the fuel, wherein the vaporized fuel is drawn out of the fuel rails to return to the fuel tank. The action and reaction of expanding liquid propane creates low pressure on a return circuit to the fuel tank during movement of the fuel due to a flow dynamic designed in to the system. The flow dynamic designed into the system is due to maintaining a constant diameter of the system thru which the fuel flows, which includes the supply lines, return lines, pumps, fittings, rails, etc. An intended benefit of the invention is to provide for a propane delivery system advancing liquid propane fuel and reducing EVAP emissions of propane through the propane delivery system in order to reduce the start time of the engine upon ignition. This action and reaction of expending liquid propane, due to high pressure and low pressure, charges the system completely before a computer in the vehicle completes a pre-ignition sequence of the vehicle.

A fuel rail of a liquid injected propane fuel system may comprise: a first elevation and a second elevation in communication, wherein the communication provides for a fuel rail first side and a fuel rail second side along a fuel rail length; the first elevation having a first rail bore, wherein in the first rail bore extends the fuel rail length; the second elevation having a second rail bore, wherein in the second rail bore extends the fuel rail length; the first rail bore and second rail bore separated by a substantially constant distant along the fuel rail length; at least one fuel injector cavity extending between the fuel rail first side and the fuel rail second side along the fuel rail length; and the at least one fuel injector cavity in communication with at least one of the first rail bore and the second rail bore, wherein the substantially constant distant provides for a vortex effect.

The first rail bore in communication with a first elevation first end, wherein the fuel enters the fuel rail. The second rail bore in communication with a second elevation second end, wherein the fuel exits the fuel rail. At least one u-shaped positioned member oriented about a second side opening of the at least one fuel injector cavity, wherein the at least one u-shaped positioned member positioned over at least one bore hole. At least one second bore hole, wherein the at least one second bore hole and the at least one bore hole are in alignment to provide for at least one of removable adjustment of the at least one retainer and an o-ring fit of a fuel injector. The vortex effect provides for a movement of a fuel through the at least one fuel injector cavity in a counter-clockwise rotation. The counter-clockwise rotation removing a vapor fuel from the at least one fuel injector cavity.

Maintenance of constant system bore diameter from the fuel pump, to the service valves, lines, the distribution block, fuel rails, and distribution block to the fuel tank is important to the system. The constant system bore diameter determines a flow dynamic of fuel consumption. As a result, voids and cavities, which allow liquid to expand to vapor are substantially removed if not do not exist. The computer, during vehicle start up, sends a signal to deliver a fuel pump primer to purge the system.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
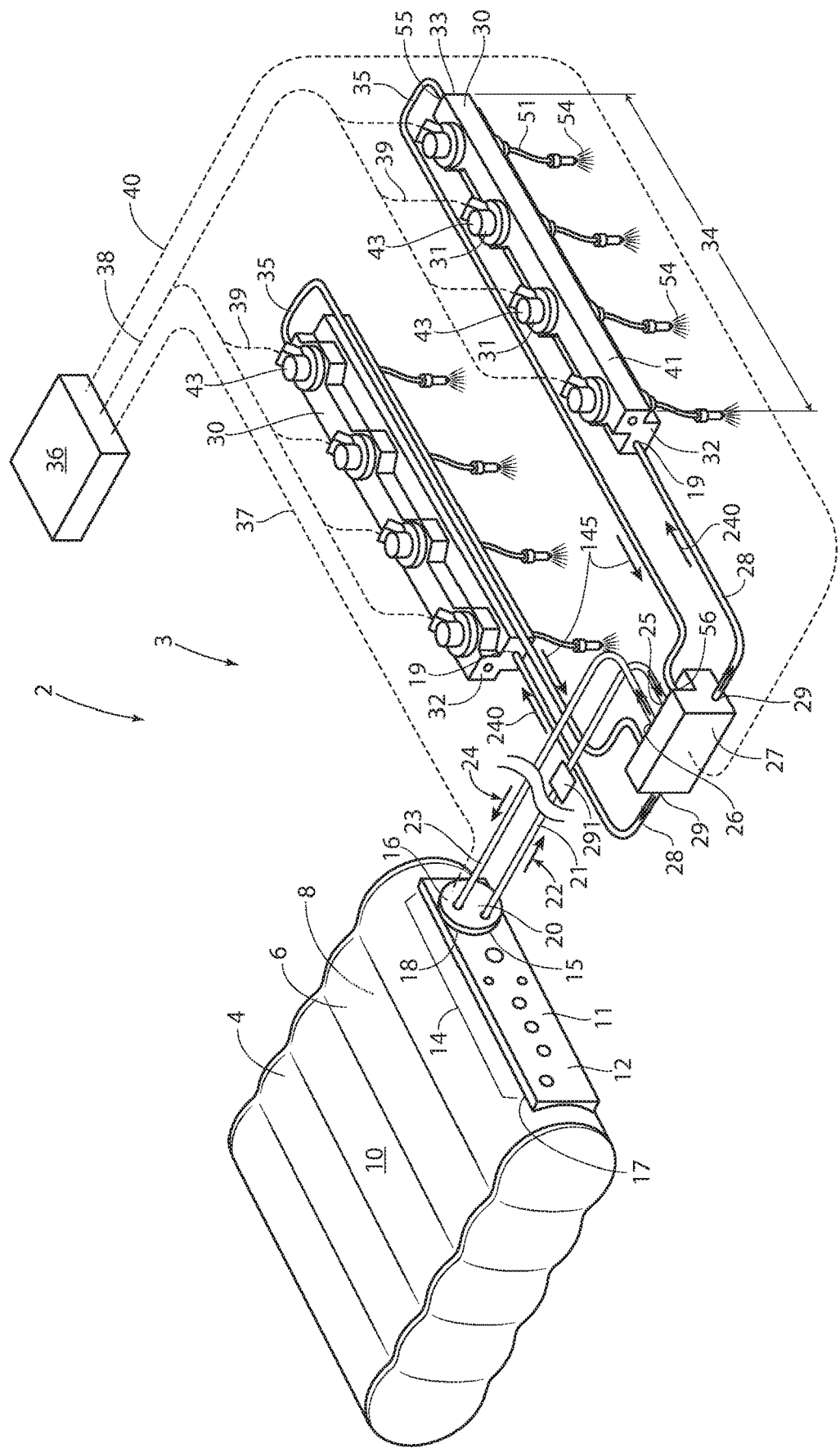
FIG. 1 is a system view of a fuel system first embodiment of the invention comprising a port fuel liquid propane injection system.

With attention to FIG. 1, a fuel system first embodiment 2 of the invention comprising a port fuel liquid propane injection system 3 is described. The fuel system first embodiment 2 comprises a fuel tank 4, a base tank valve adaptor (BTVA) assembly 16, a distribution block 27, at least on fuel rail 30, and an electronic control unit (ECU) 36 in communication for the controlled distribution of fuel to an engine assembly (not illustrated in the figure). 6. The fuel tank shell 6 defines an internal cavity 8 of the fuel tank 4, wherein the internal cavity 8 provides for storage of fuel (115, 124). An access panel 12 is in communication with an exterior surface 10 of the fuel tank 4 along an access panel second side 17. Preferably the access panel 12 is in weldable communication with the fuel tank 10 along the access panel second side 17. Alternatively, the access panel 12 may be in removable communication with the fuel tank 4 along the access panel second side 17. An access panel first side 11 extends away from the fuel tank 4, opposite the access panel second side 17. The access panel first side 11 provides for at least one access port 14. As illustrated in FIGS. 5, 9A-9C and 10, at least one of the at least one access port 14 extends through the access panel 12 and proceeds through the fuel tank shell 6, providing access to the internal cavity 8 of the fuel tank 4. It is understood the invention may comprise one or more access ports 14. At least one access port 14 may be an at least one BTVA port 15. The at least one BTVA port 15 provides for the BTVA 16. The BTVA comprises a BTVA first side 18 and a BTVA second side 20. The BTVA first side 18 in communication with the access panel 12. The BTVA second side 20 is oppositely opposed to the BTVA first side 18 and extended away from the access panel 12.

At least one supply line 21 is in communication with the BTVA second side 20. The supply line 21 in extended communication from the BTVA second side 20 such that the supply line 21 extends away from the access panel 12, wherein in fuel travels through the supply line 21 in a first direction 22 away from the fuel tank 4. At least one return line 23 is in communication with the BTVA second side 20. The return line 23 in extended communication from the BTVA second side 20 such that the return line 23 extends away from the access panel 12, wherein in fuel travels through the return line 23 in a second direction 24 in the direction of the fuel tank 4.

The distribution block 27 is in communication with a supply line second end 25 of the supply line 21. Fuel travels from the BTVA 16, through the supply line 21. Past the supply line second end 25, and into the distribution block 27. The distribution block 27 is in communication with a return line second end 26 of the return line 23. Wherein fuel returning to the fuel tank 4, travels from the distribution block 27, past the return line second end 26 and into the return line 23, through the BTVA, and into the fuel tank 4. The distribution block is in communication with at least one distribution block to fuel rail tube 28. Wherein a distribution block to fuel rail tube first end 29 of the distribution block to fuel rail tube 28 is in communication with the distribution block 27. Further, a distribution block to fuel rail tube second end 19 of the distribution block to fuel rail tube 28 is in communication with at least one fuel rail 30 at a fuel rail first end 32 of the fuel rail 30. Wherein fuel (115, 124) travels in a seventh direction 240 from the distribution block 27, past the distribution block to fuel rail tube first end 29 and into the distribution block to fuel rail tube 28, through the distribution block to fuel rail tube 28, past the fuel rail first end 32 and into the fuel rail 30.

The fuel rail 30 comprises the fuel rail first end 32 and a fuel rail second end 33, wherein the fuel rail first end 32 and the fuel rail second end 33 are separated by a fuel rail body 41. The combination of the fuel rail first end 32, the fuel rail second end 33 and the fuel rail body 41 having a fuel rail length 34. At least one port injection fuel injector assembly 31 is positioned along the fuel rail length 34 of the fuel rail 30. The port injection fuel injector assembly 31 comprises at least one of a port injection fuel injector 43, port injection fuel injector/nozzle tube 51, and port injection injector nozzle 54. Wherein the port injection fuel injector assembly 31 provides for transferring of fuel (not illustrated in the figure) from the fuel rail 30 to the engine assembly (not illustrated in the figure).

At least one of the at least one fuel rail 30 is in communication with at least one fuel rail to distribution block tube 35. The fuel rail 30 is in communication with a fuel rail to distribution block tube first end 55 of the fuel rail to distribution block tube 35 at the fuel rail second end 33. Further, a fuel rail to distribution block tube second end 56 of the fuel rail to distribution block tube 35 is in communication with the distribution block 27. Wherein fuel travels in a fourth direction 145 from the fuel rail 30, past the fuel rail to distribution block tube first end 55 and into the fuel rail to distribution block tube 35, through the fuel rail to distribution block tube 35, past the fuel rail to distribution block tube second end 56 and into the distribution block 27 for return to the fuel tank 4.

The ECU 36 is in electrical communication with the pump (not illustrated in the figure) through the ECU/pump communication 37. The ECU 36 is in electrical communication with at least one of the at least one port injection fuel injector assemblies 31 through the ECU/fuel injector assembly communication 38. Further the ECU/fuel injector assembly communication 38 provides for at least one ECU/fuel injector assembly communication extender 39 to provide for electrical communication to individual port fuel injector assemblies 31. The ECU 36 is in electrical communication with the distribution block 27 through the ECU/distribution block communication 40. The combination of the communication between the ECU 36 and at least one at least port one fuel injector assembly 31, the ECU and the pump, and the ECU 36 and the distribution block 27 provides for controlling the distribution of fuel (115, 124) to the engine assembly (not illustrated in the figure), and provides for controlling the fuel in at least substantially a liquid state within the fuel system second embodiment 2'. Fuel (115, 124) as descried may be in at least one of a liquid (115), vapor (124) or solid state. Fuel (115, 124) as described may be propane. Alternatively, fuel (115, 124) as described may be any form of fuel known in the industry.

IL is observed the fuel system first embodiment 2 of the invention comprising a port fuel liquid propane injection system 3 maintains a positive pressure differential on the fuel (115, 124) between a pressure on the fuel in the fuel tank 4 and a pressure on the fuel in the remainder of the fuel system first embodiment 2. Therefore, the fuel (115, 124) maintains a liquid state throughout the fuel system first embodiment 2 up to and beyond the disbursement of the fuel from the at least one port injection injector nozzle 54 and into the engine assembly (not illustrated in the figure).

It is understood elements of the fuel system first embodiment 2 of the invention comprising a port fuel liquid propane injection system 3 though described in the singular or the plurality may exists in either or both of the singular and the plurality within the fuel system first embodiment 2 of the invention comprising a port fuel liquid propane injection system 3.

Figure 2:
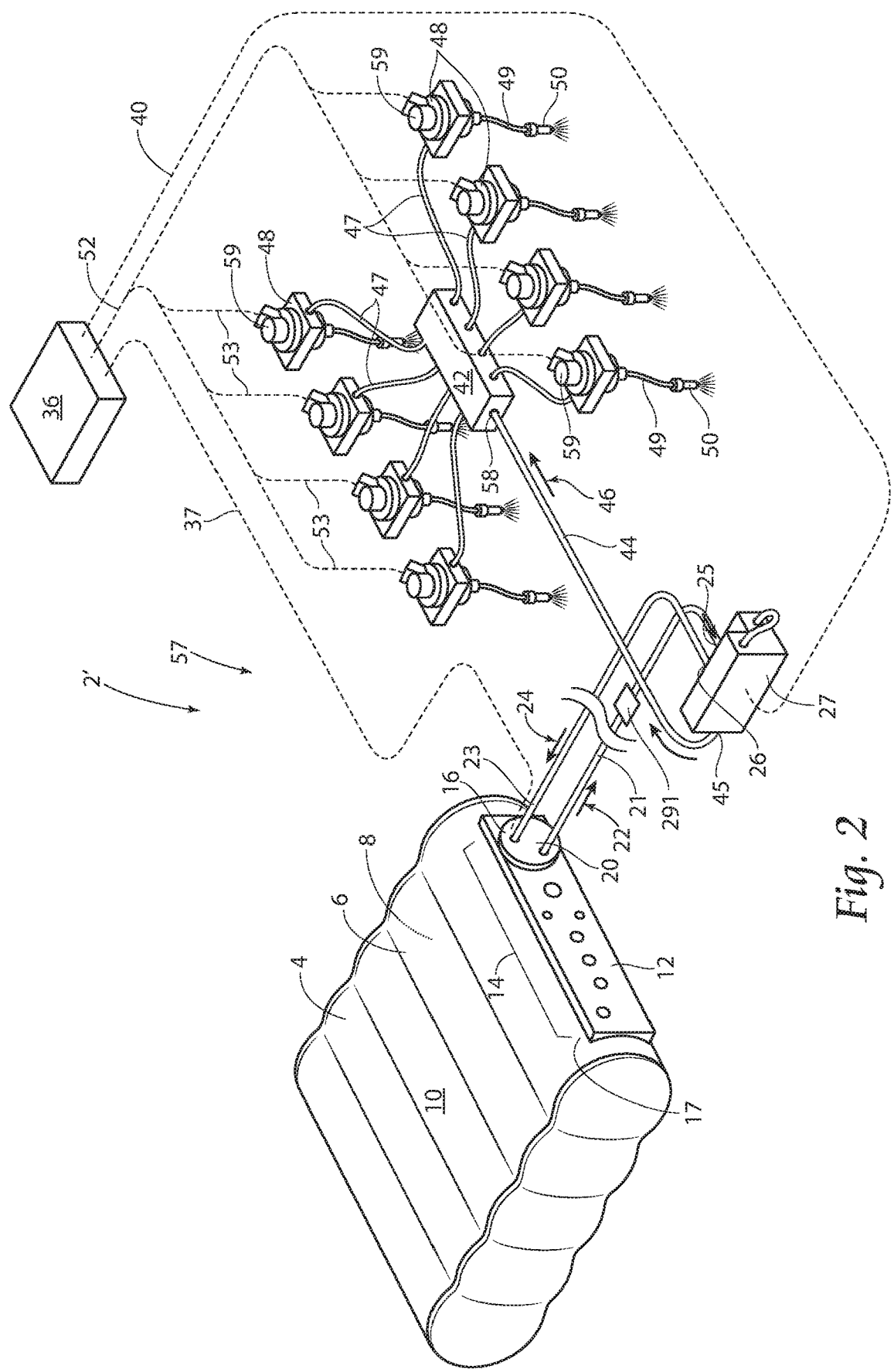
FIG. 2 is a system view of a fuel system second embodiment of the invention comprising a direct injection system.

With attention to FIG. 2, a fuel system second embodiment 2' of the invention comprising a direct injection system 57 is described. The fuel system second embodiment 2' of the invention comprising a direct injection system 57 incorporates the fuel tank 4, the supply line 21, the return line 23, and the distribution block 27 of the fuel system first embodiment 2 of the invention comprising a port fuel liquid propane injection system 3. The distribution block 27 is in communication with at least one distribution block to common rail tube 44. Wherein a distribution block to common rail tube first end 45 of the distribution block to common rail tube 44 is in communication with the distribution block 27. Further, a distribution block to common rail tube second end 58 of the distribution block to common rail tube 44 is in communication with at least one common fuel rail 42. Wherein fuel travels from the distribution block 27, past the distribution block to common rail tube first end 45 and into the distribution block to common rail tube 44. The fuel travels in a third direction 46 through the distribution block to common rail tube 44, towards the common fuel rail 42. The fuel (115, 124) proceeds into the common fuel rail 42.

At least one common rail/direct fuel injector tube 47 is in communication with the common fuel rail 42 and at least one direct injection fuel injector assembly 59 at oppositely opposed ends of the common rail/direct fuel injector tube 47. The direct injection fuel injector assembly 59 comprises at least one of a direct injection fuel injector 48, direct injection fuel injector/nozzle tube 49, and direct injection fuel injector nozzle 50. Wherein the common rail/direct fuel injector tube 47 provides for transfer of fuel (not illustrated in the figure) from the common rail 42 to an at least one direct injection fuel injector 48. The at least one direct injection fuel injector/nozzle tube 49 is in communication with the at least one of the at least one direct fuel injectors 48 and at least one direct injection injector nozzle 50 at oppositely opposed ends of the direct injection fuel injector/nozzle tube 49. Wherein the direct injection fuel injector/nozzle tube 49 provides for transfer of fuel (not illustrated in the figure) from the at least one direct fuel injector 48 to the at least one direct injection injector nozzle 50 and into the engine assembly (not illustrated in the figure). Wherein the direct injection fuel injector assembly 59 provides for transferring of fuel (not illustrated in the figure) from the common fuel rail 42 to the engine assembly (not illustrated in the figure).

The ECU 36 is in electrical communication with the pump (not illustrated in the figure) through the ECU/pump communication 37. The ECU 36 is in electrical communication with at least one of the at least one direct injection fuel injector assemblies 59 through the ECU/direct injection fuel injector assembly communication 52. Further the ECU/direct injection fuel injector assembly communication 52 provides for at least one ECU/direct injection fuel injector assembly communication extender 53 to provide for electrical communication to individual direct injection fuel injector assemblies 59. The ECU 36 is in electrical communication with the distribution block 27 through the ECU/distribution block communication 40. The combination of the communication between the ECU 36 and at least one at least one direct injection fuel injector assembly 59, the ECU 36 and the pump, and the ECU 36 and the distribution block 27 provides for controlling the distribution of fuel (115, 124) to the engine assembly (not illustrated in the figure), and provides for controlling the fuel in at least substantially a liquid state with the fuel system second embodiment 2'.

It is observed the fuel system second embodiment 2' of the invention comprising a direct injection system 57 maintains a positive pressure differential on the fuel (115, 124) between a pressure on the fuel in the fuel tank 4 and a pressure on the fuel in the remainder of the fuel system second embodiment 2'. Therefore, the fuel (115, 124) maintains a liquid state throughout the fuel system second embodiment 2' up to and beyond the disbursement of the fuel from the at least one direct injection injector nozzle 50 and into the engine assembly (not illustrated in the figure).

It is understood elements of the fuel system second embodiment 2' of the invention comprising a direct injection system 57 though described in the singular or the plurality may exist in either or both of the singular and the plurality within the fuel system second embodiment 2' of the invention comprising a direct injection system 57.

Figure 3:
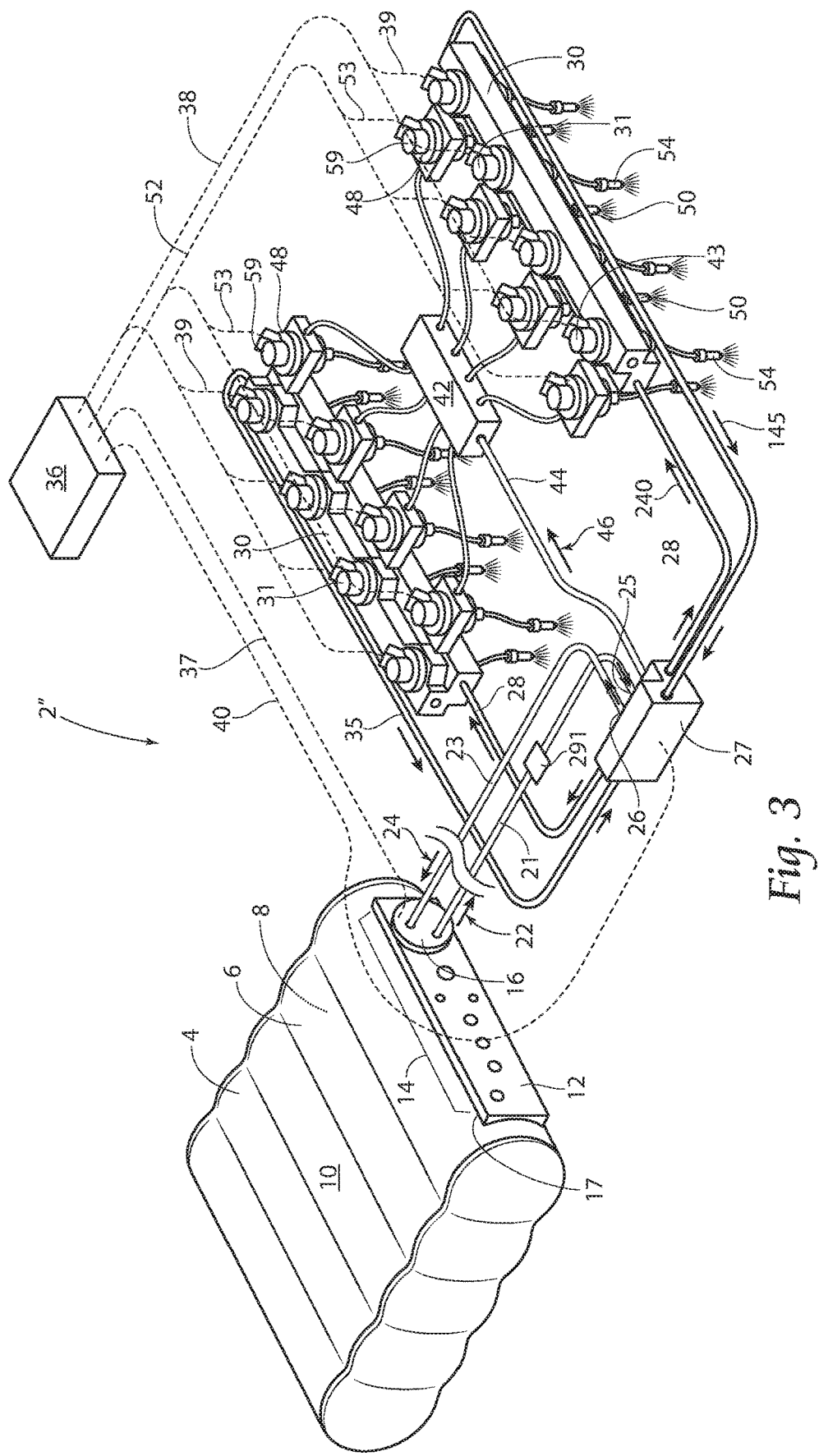
FIG. 3 is a system view of a fuel system third embodiment of the invention comprising a port fuel liquid propane injection system and a direct injection system.

With attention to FIG. 3, a fuel system third embodiment 2" of the invention comprising a port fuel liquid propane injection system 3 and a direct injection system 57. It is understood the system third embodiment 2" of the invention may comprise a port fuel liquid propane injection system 3 and a direct injection system 57 wherein an external pump assembly 137 is applied to the direct injection system 57. It is understood the fuel system third embodiment 2" may comprise at least one element of the fuel system first embodiment 2. It is understood the fuel system third embodiment 2" may comprise at least one element of the fuel system second embodiment 2'.

It is observed the fuel system third embodiment 2 of the invention maintains a positive pressure differential on the fuel (115, 124) between a pressure on the fuel in the fuel tank 4 and a pressure on the fuel in the remainder of the fuel system third embodiment 2". Therefore, the fuel (115, 124) maintains a liquid state throughout the fuel system third embodiment 2" up to and beyond the disbursement of the fuel from at least one of the at least one direct injection injector nozzle 50 and the at least one port injection injector nozzle 54, and into the engine assembly (not illustrated in the figure).

The system view of a fuel system third embodiment 2" of the invention comprising a port fuel liquid propane injection system and a direct injection system may apply an external pump assembly 137 to the direct injection system.

It is understood elements of the fuel system third embodiment 2" of the invention though described in the singular or the plurality may exist in either or both of the singular and the plurality within the fuel system third embodiment 2".

Figure 4:
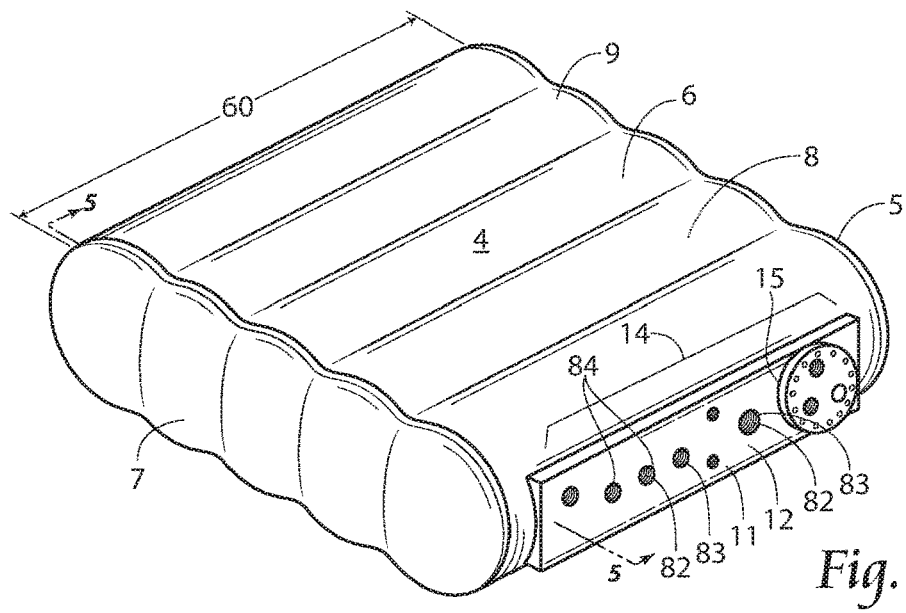
FIG. 4 is a perspective view of a fuel tank.
Figure 5:
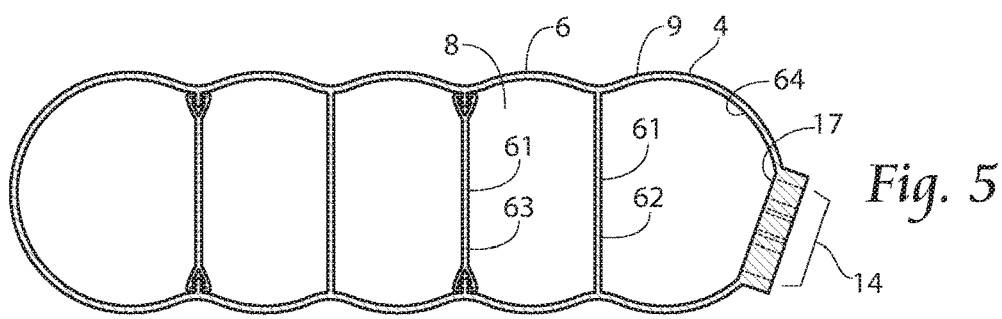
FIG. 5 is a cross-section is a fuel tank.

With attention to FIGS. 4 and 5, the fuel tank 4 is illustrated. The fuel tank 4 comprises a fuel tank shell 6.

Wherein the fuel tank shell 6 is defined by a fuel tank first side 5 and an oppositely opposed fuel tank second side 7 separated by a fuel tank cylindrical body 9. The communication of the fuel tank first side 5, the fuel tank second side 7 and the fuel tank cylindrical body 9 provides for the fuel tank shell 6. As previously noted, the fuel tank shell 6 defines an internal cavity 8 of the fuel tank 4, wherein the internal cavity 8 provides for storage of fuel (not illustrated in the figure). The fuel tank shell 6 preferably provides for a fuel tank 4 having a cylindrical shape. Alternatively, the fuel tank 4 may comprise a polygonal cross-section over a fuel tank length 60. Alternatively, the fuel tank 4 may comprise a spherical shape. Alternatively, the fuel tank 4 may comprise a polyhedron shape.

As illustrated in FIG. 5, a cross-section of the fuel tank 4, the fuel tank 4 preferably comprises at least one partition 61. The partitions 61 preferably extend at least substantially the fuel tank length 60. Alternatively, the partitions 61 may extend less than substantially the fuel tank length 60. The partitions 60 comprise at least one of at least one static partition 62 and at least one removable partition 63. The static partition 62 is preferably in weldable communication with an interior surface 64 of the fuel tank shell 6. Alternatively, the static partition 62 may be in riveted communication with the fuel tank shell 6. Alternatively, the static partition 62 may be in bolted communication with the fuel tank shell 6.

As illustrated in FIGS. 1, 2, 3 and 5, the access panel 12 is in communication with an exterior surface 10 of the fuel tank 4 along an access panel second side 17. The access panel first side 11 extends away from the fuel tank 4, opposite the access panel second side 17.

Figure 6A:
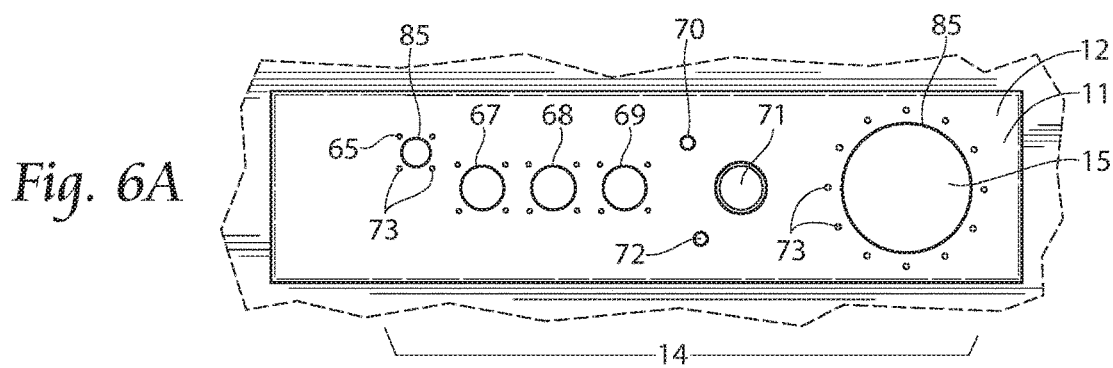
FIG. 6A is a front view of an access panel illustrating an at least one access panel port.
Figure 6B:
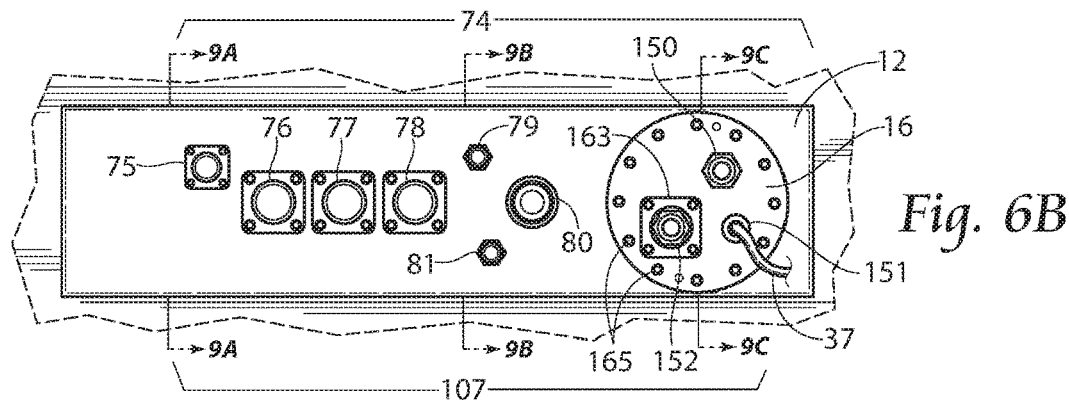
FIG. 6B is a front view of an access panel illustrating components in communication with the at least one access panel ports.
Figure 6C:
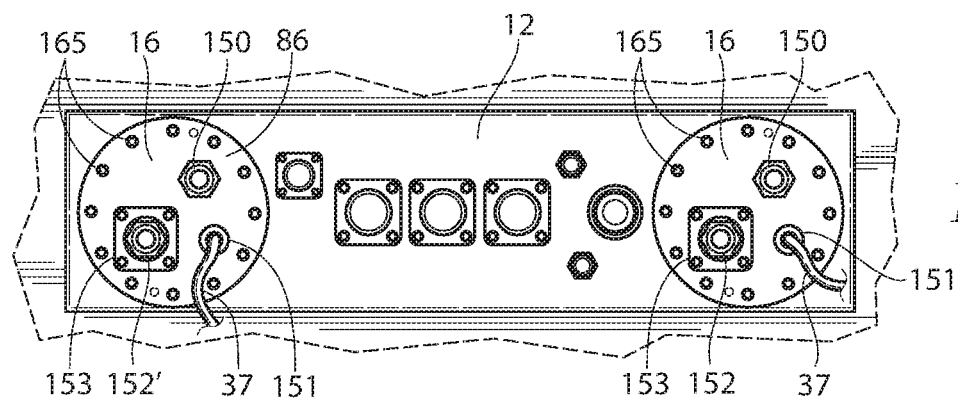
FIG. 6C is a front view of an access panel illustrating at least one BTVA in communication with the access panel.

With attention to FIGS. 6A, 6B and 6C, the access panel 12 is further disclosed. As illustrated FIG. 6A, a front view of the access panel 12 illustrating an at least one access panel port 14. The access panel first side 11 provides for the at least one access port 14. The at least one access port 14 comprises at least one of an at least one fill port 65, an at least one liquid level gauge port 67, an at least one service valve port 68, an at least one second fill port 69, an at least one spitter valve port 70, an at least one pressure relief valve port 71, an at least one liquid port 72 and the at least one BTVA port 15. It is observed the orientation of the at least one of an at least one fill port 65, the at least one liquid level gauge port 67, the at least one service valve port 68, the at least one second fill port 69, the at least one spitter valve port 70, the at least one pressure relief valve port 71, the at least one liquid port 72 and the at least one BTVA port 15 is not limited to what is illustrated in the figures. As illustrated in FIG. 5, at least one of the at least one access port 14 may provide for a bore 84 where in the bore 84 extends through the access panel 12 and proceeds through the fuel tank shell 6, providing access to the internal cavity 8 of the fuel tank 4. As illustrated in FIG. 4, the combination of the at least one of the at least one access ports 14 and the bore 84 associated with the at least one access port 14 may provide for at least one groove 82 about the circumference 83 of the bore 84, wherein an at least one component 74 may be in removable communication with the access panel 12. As illustrated in FIG. 6A, at least one of the at least one access ports 14 may provide for at least one mounting hole 73 about a port circumference 85 of at least one of the at least one access ports 14, wherein an at least one component 74 may be in removable communication with the access panel 12. As illustrated in FIG. 6B, the at least one BTVA port 15 may provide for at least one at least one mounting hole 73 about the port circumference 85 of the at least one BTVA port 15.

As illustrated in FIG. 6B, a front view of an access panel 12 illustrating at least one component 107 in communication with the at least one access panel ports 14, the at least one fill port 65 may be in removable communication with an at least one fill port assembly 75, wherein the combination of the at least one fill port 65 and the at least one fill port assembly 75 provides for filling the fuel tank 4 with fuel (not illustrated in the figure) to at least 80% volumetric capacity of the fuel tank 4. The at least one liquid level gauge port 67 may be in removable communication with an at least one sending unit 76, wherein the at least one sending unit 76 may communicate with a fixed level gauge remote from the fuel tank 4. The at least one service valve port 68 may be in removable communication with an at least one of an at least one pressure gauge and at least one service valve 77, wherein a pressure within the fuel tank 4 may be measured. The at least one second fill port 69 may be in removable communication with an at least one second fill port assembly 78, wherein the combination of the at least one second fill port 69 and the at least one second fill port assembly 78 provides for filling the fuel tank 4 with fuel (not illustrated in the figure) to at least 80% volumetric capacity of the fuel tank 4. The at least one spitter valve port 70 may be in removable communication with at least one spitter valve 79, wherein gas and evaporation may be removed from the fuel tank 4. The at least one pressure relief valve port 71 may be in removable communication with at least one pressure relief valve 80, wherein within the fuel tank 4 may be controlled by release of fuel tank 4 contents. The at least one liquid port 72 may be in removable communication with at least one liquid valve 81, wherein liquid fuel within the fuel tank may be released.

Figure 8:
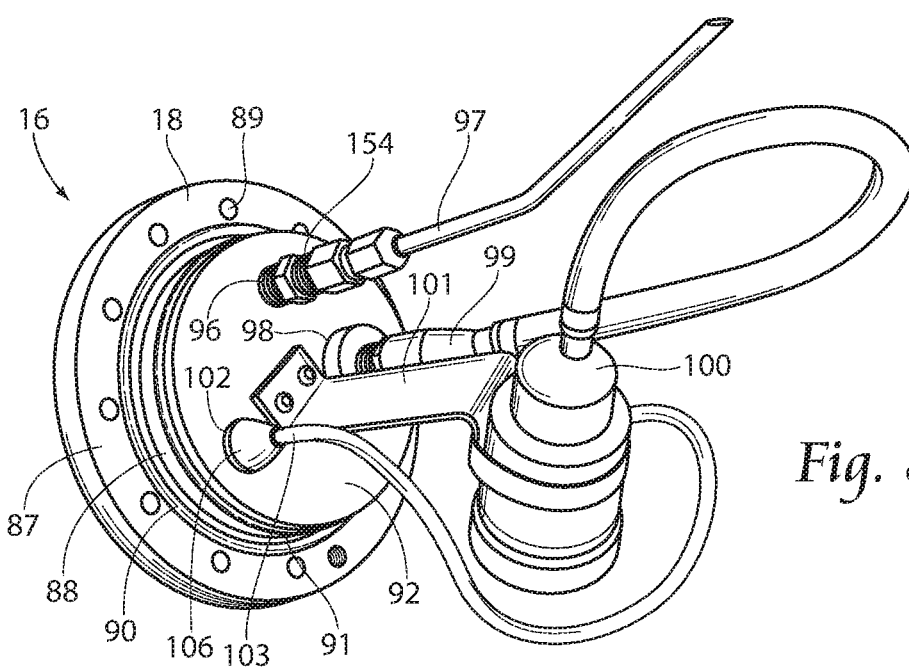
FIG. 8 is a perspective view of the BTVA in communication with components.

The at least one BTVA port 15 may be in removable communication with at least one BTVA 16. The atleast one BTVA 16 comprises a first pill 150 providing access to the first bore 96 (ref. FIG. 8) on the BTVA second side 20, wherein the return line 23 is in removable communication with the first bore 96. Alternatively, the at least one BTVA 16 comprises a first pill 150 providing access to the first bore 96 on the BTVA second side, wherein the return is in fixed communication with the first bore 96. The first pill 150 providing for control of the flow of liquid fuel 115 to the fuel tank 4 in order to maintain liquid fuel 115 throughout the (system 2, 2', 2"), controls back pressure of the closed loop. The at least one BTVA 16 comprises a supply solenoid control manual shut-off valve 152 providing access to the second bore 96 (ref. FIG. 8) on the BTVA second side 20, wherein the supply line 21 is in removable communication with the second bore 98. Alternatively, the at least one BTVA 16 comprises the supply solenoid control manual shut-off valve 152 providing access to the second bore 98 on the BTVA second side 20, wherein the supply line 21 is in fixed communication with the second bore 98. The supply solenoid control manual shut-off valve 152 may be accompanied by a supply solenoid control manual shut-off valve plate 153 in communication with the BTVA second side 20. The at least one BTVA 16 comprises a third bore fastener 151 providing access to the third bore 102 (ref. FIG. 8) on the BTVA second side 20, wherein the ECU/pump communication 37 is in removable communication with the third bore 102. Alternatively, the atleast one BTVA 16 comprises a third bore fastener 151 providing access to the third bore 102 (ref. FIG. 8) on the BTVA second side 20, wherein the ECU/pump communication 37 is in fixed communication with the third bore 102. The supply solenoid control shut-off valve 152 is a manual shut-off valve for safety requirements.

As illustrated in FIG. 6C, a front view of an access panel, the access panel may provide for at least one BTVA 16 in communication with the access panel. A second BTVA 86 is provided in communication with the access panel 12. The arrangement of the access panel 12 illustrated in FIG. 6C may be employed in many scenarios, at least two scenarios are 1) high performance applications, and 2) the fuel system third embodiment 2" with a pulse switch modulated pump (not illustrated in the figures). In scenarios the fuel system third embodiment 2" with the pulse switch modulated pump (not illustrated in the figures), and other scenarios employing the fuel system third embodiment 2", the BTVA 16 may be connected to the solenoid control manual shut-off valve 152 which as described is connected to the distribution block which as described is connected to the fuel rails. Wherein the second BTVA 86 is connected to a second solenoid control manual shut-off valve 152' which as described may be connected to a high pressure pump for a direct injection system.

Figure 7:
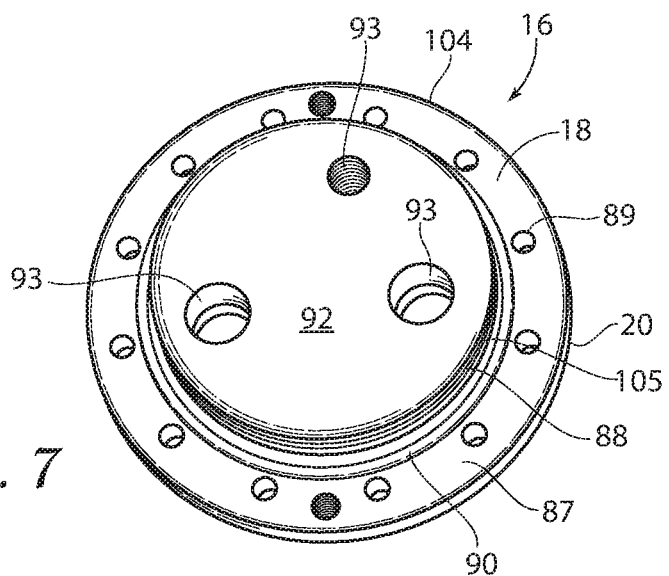
FIG. 7 is a back view of a base tank valve adaptor (BTVA).

With attention to FIGS. 7 and 8, the BTVA 16 is further disclosed. As illustrated in FIG. 7A, a back view of the BTVA 16 is illustrated. The BTVA comprises a BTVA first section 87 and a BTVA second section 88 in communication such that the BTVA first side 18 of the BTVA first section 87 is in direct communication with the BTVA second section 88. A BTVA second section inner face 92 extends opposite the BTVA first side 18 of the BTVA first section 87, wherein the BTVA second section 88 is in close communication with the port circumference 85 of the BTVA port 15 when the BTVA 16 is complemented with the access panel 12. At least one BTVA mounting hole 89 is in close proximity to the perimeter 104 of the BTVA first section 87, wherein at least one of the BTVA mounting holes 89 extends from the BTVA first side 18 to the BTVA second side 20. At least one of the BTVA mounting holes 89 is in alignment with at least one mount hole 73 about the port circumference 85 of the at least one BTVA port 15 wherein the communication of the at least one of the BTVA mounting holes 89 and at least one mount hole 73, about the port circumference 85 of the at least one BTVA port 15, provides for complementing the BTVA 16 with the access panel 12. At least one mounting bolt 165 is in insertable and removable communication with the aligned at least one of the BTVA mounting holes 89 and at least one mount hole 73. The BTVA second section 88 provides for a second section perimeter 105 at least in substantial proximity to the BTVA first section. A first seal 90 is positioned on the BTVA first side 18 about the second section perimeter 105, wherein the first seal 90 extends at least substantially about the second section perimeter 105. The first seal 90 communicates with the access panel first 11, when the BTVA 16 and access panel 12 are complemented, to provide for sealable communication. The second section perimeter 105 extends from at least in substantial proximity to the BTVA first section to the BTVA second section inner face 92. A second seal 91 is positioned at least substantially about second section perimeter 105 at a predetermined location between the BTVA first section and the BTVA second section inner face 92, wherein the second seal 91 provides for sealable communication between the BTVA second section 88 and the port circumference 85 of the BTVA port 15 when the BTVA 16 is complemented with the access panel 12.

At least one, preferably three, BTVA bores 93 extend from the BTVA second side 20, the BTVA first section 87 and the BTVA second section 88, and to and beyond the BTVA second section inner face 92, wherein the BTVA bores 93 provide access to the internal cavity 8 of the fuel tank 4 when the BTVA 16 is complemented with the access panel 12. A first bore 96 is in communication with the return line 23. The first bore 96 provides for communication of the return line 23 to a return shaft 97, connected to the BTVA second section inner face 92 side of the first bore 96, wherein fuel (not illustrated in the figure) returns to the fuel tank 4. The connection of the return shaft 97 to the first bore 96 may be assisted by a fitting assembly 154. A second bore 98 is in communication with the supply line 21. The second bore 98 provides for communication of the supply line 21 to a pump 100 via a pump connection 99, where the pump connection 99 is connected to the BTVA second section inner face 92 side of the second bore 98 and to the pump 100 such that fuel is propelled from the pump 100 through the second bore 98 and into the supply line 21. The pump may be in removable communication with the BTVA second section inner face 92 thru the application of a mechanism 101. Alternatively, the pump may be in fixed communication to the BTVA second section inner face 92 thru the application of mechanism 101. A third bore 102 is in communication with the ECU pump/communication 37. The third bore 102 provides for continued communication of the ECU pump/communication 37 through the third bore 102 and to the pump 100, wherein the ECU 36 communicates to the pump 100 to provide for at least one of turning on the pump 100 and turning off the pump 100 as directed by the demand of the system (2, 2', 2"). Communication of the ECU pump/communication 37 from the BTVA second section inner face 92 opening 106 of the third bore 102 to the pump 100 may be provided through an electrical extension 103.

Figure 9A:
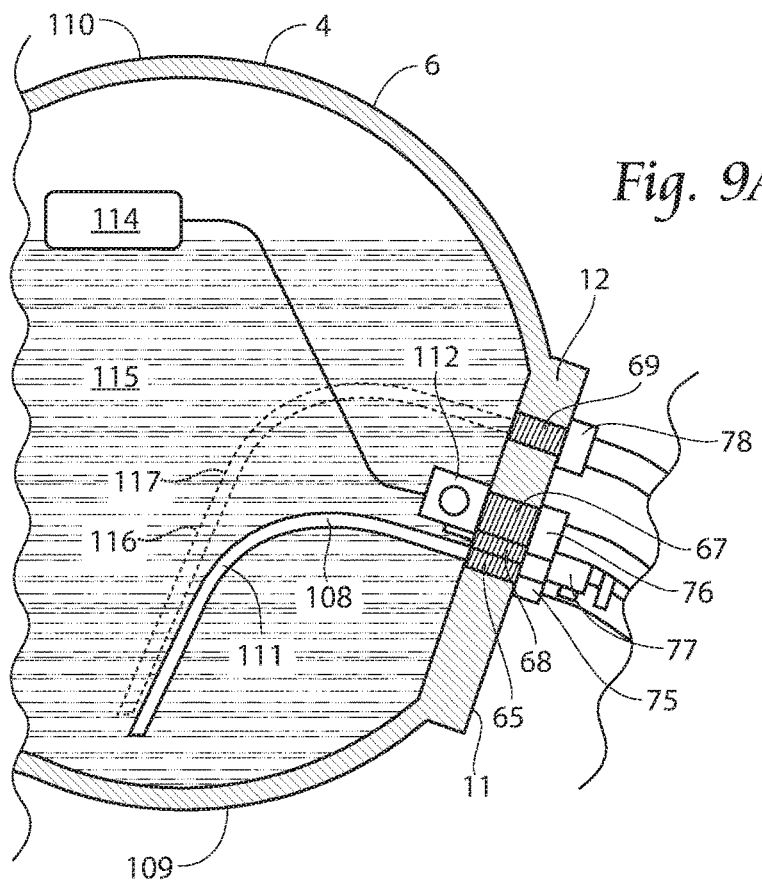
FIG. 9A is a cross-section of a fuel tank in communication with an access panel, illustrating communication of at least one component with the fuel tank.
Figure 9B:
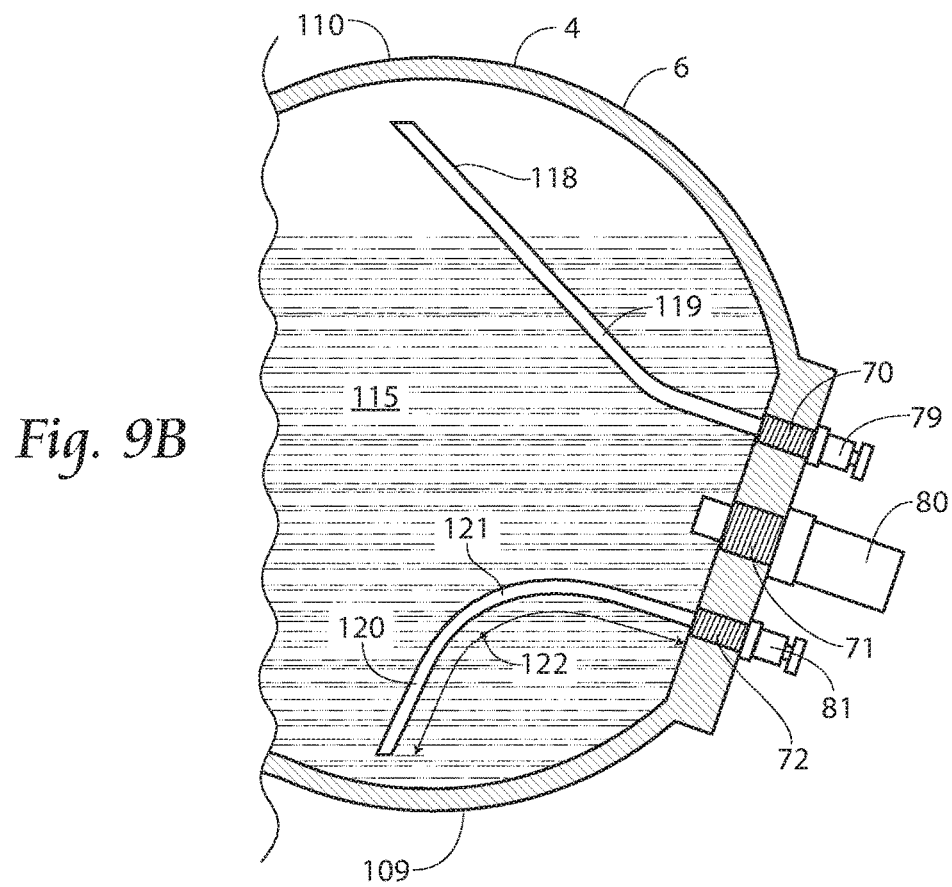
FIG. 9B is a cross-section of the fuel tank in communication with the access panel, illustrating communication of at least one component with the fuel tank.
Figure 9C:
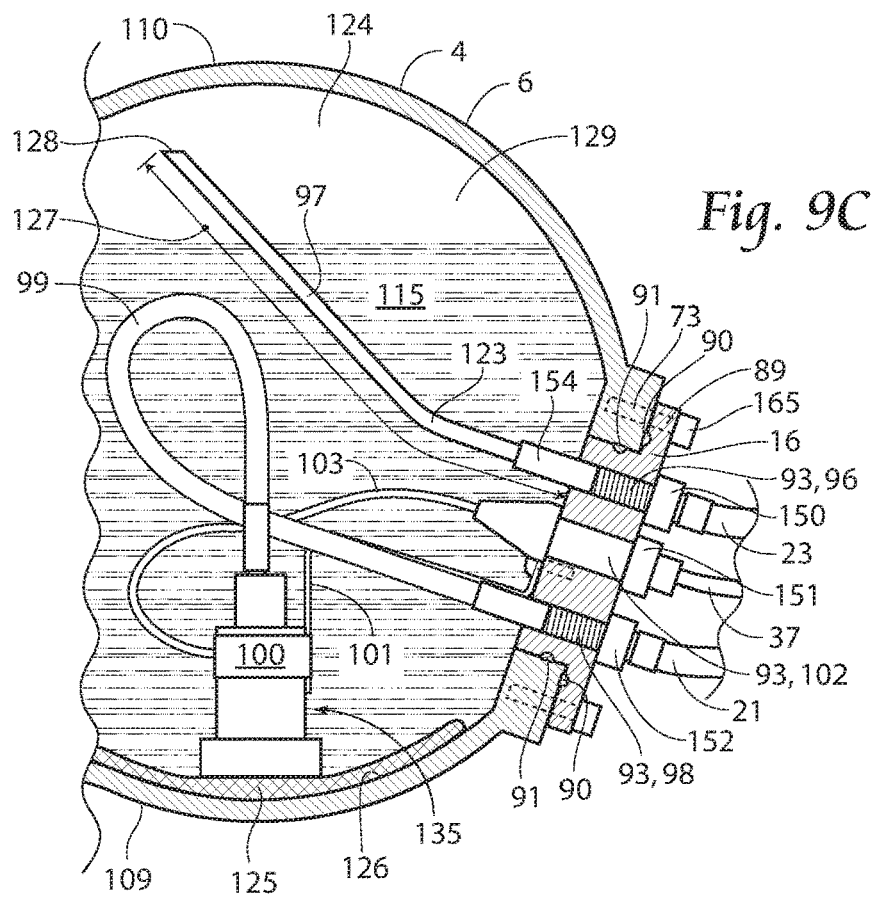
FIG. 9C is a cross-section of the fuel tank in communication with the access panel, illustrating communication of at least one component with the fuel tank.

With attention FIGS. 9A, 9B and 9C, the fuel tank 4 in communication with the access panel 12, illustrating communication of at least one component 107 with the fuel tank 4. As illustrated in FIG. 9A, the fill port assembly 75 extends through the fill port 65 and into the internal cavity 8 of the fuel tank 4. Within the internal cavity 8, the fill port assembly 75 provides for a fill port assembly tube 108. The fill port assembly tube 108 having an angled orientation 111 in the direction of a fuel tank third side 109. The sending unit 76 extends through the liquid level gauge port 67. A sending unit internal section 112 provides for a float assembly 114. Wherein the sending unit 76 applies the float assembly 114 to measure a level pf liquid fuel 115 within the fuel tank 4. The pressure gauge 77 extends through the service valve port 68 and into the internal cavity 8. A second fill port assembly 78 extends through the second fill port 69 and into the internal cavity 8 of the fuel tank 4. Within the internal cavity 8, the second fill port assembly 78 provides for a second fill port assembly tube 116. The second fill port assembly tube 116 having a second angled orientation 117 in the direction of the fuel tank third side 109.

As illustrated in FIG. 9B, the liquid valve 81 extends through the liquid port 72. Within the internal cavity 8, the liquid valve 81 provides for a liquid valve tube 120. The liquid valve tube 120 having a third angled orientation 121 in the direction of a fuel tank third side 109. Alternatively, the liquid valve tube 120 may have a third angled orientation 121 substantially perpendicular to the access panel 12 for a duration of a liquid valve tube length 122. The pressure relief valve 80 extending through the pressure relief valve port 71 and into the internal cavity 8. The spitter valve 79 extends through the spitter valve port 70. Within the internal cavity 8, the spitter valve 79 provides for a spitter valve tube 118. The spitter valve tube 118 having a spitter valve angled orientation 119 in the direction of a fuel tank fourth side 110.

As illustrated in FIG. 9C, a first pump position 135 is described. The pump 100 preferably resides upon a fuel acquisition cushion 125. The fuel acquisition cushion 125 resides upon the fuel tank third side internal surface 126. Wherein the fuel acquisition cushion 125 provides a method for providing the pump 100 with liquid fuel 115 to distribute into the system (2, 2', 2"). Alternatively, the pump 100 resides directly upon the fuel tank third side internal surface 126. The return shaft 97 having a return shaft length 127. Wherein the return shaft 97 extends into the internal cavity 8 through at least substantially the return shaft length 127. The return shaft 97 having a fourth angled orientation 123 in the direction of a fuel tank fourth side 110. Preferably a return shaft end point 128, opposite the BTVA second section inner face 92, is in contact with a vapor section 129 of the internal cavity 8. Wherein fuel returns to the fuel tank 4 within the return line 23, the fuel transfers to the return shaft 97, the fuel proceeds through the return shaft 97 and exists the return shaft 97 at the return shaft end point 128. The fuel existing the return shaft end point 128 transforms at least substantially to a vapor fuel 124. The transformation of the fuel from substantially a liquid fuel 115 to a vapor fuel 124 provides for an endothermic transformation, cooling the internal cavity 8 and the vapor 124 and liquid fuel 115 within the internal cavity 8. The cooling promotes transformation of vapor fuel 124 to liquid fuel 115 and the maintaining of the fuel as liquid fuel 115 within the system (2, 2', 2").

Figure 10:
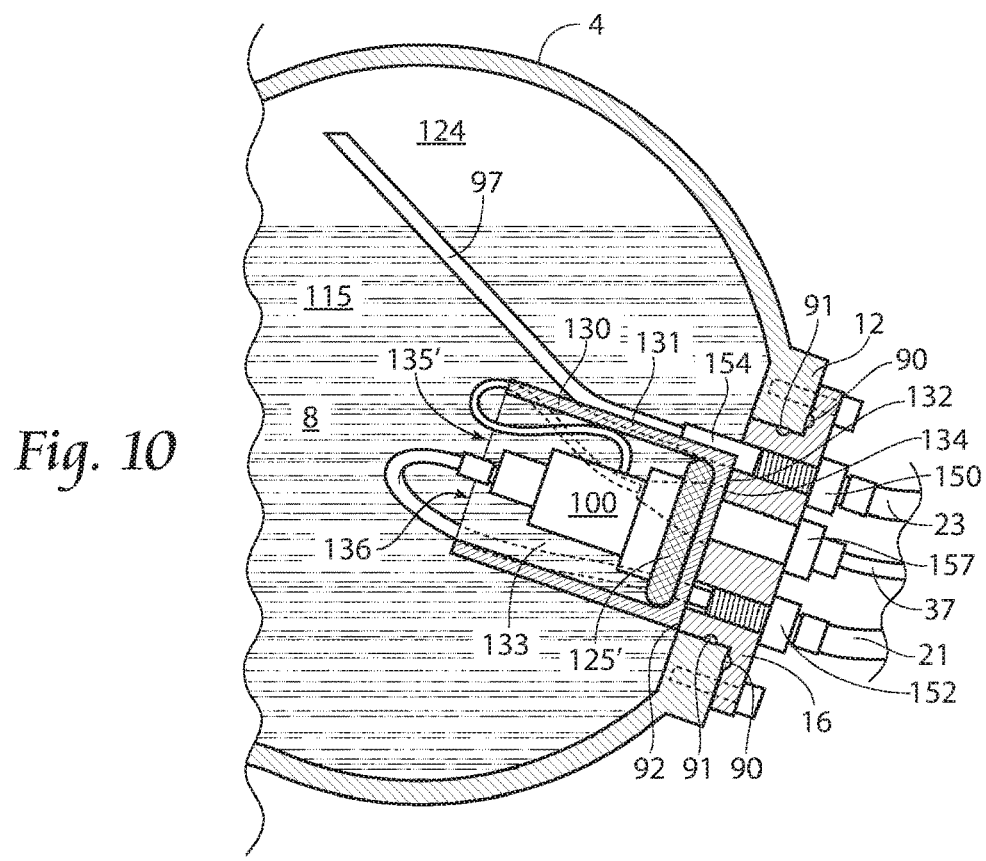
FIG. 10 is a cross-section of the fuel tank in communication with the access panel, illustrating the pump in close communication with the BTVA.

With attention to FIG. 10, the fuel tank 4 in communication with the access panel 12 wherein the pump 100 is in close communication with the BTVA 16, a second pump position 135' is described. A housing 130 is in communication with the BTVA second section inner face 92. The housing 130 comprises a three dimensional body 131 having an exterior shell 132 which defines a housing internal cavity 133. An exterior shell external surface 134, opposite the housing internal cavity 133, is in communication with the BTVA second section inner face 92. The exterior shell external surface 134, opposite the housing internal cavity 133, is preferably in fixed communication with the BTVA second section inner face 92. Alternatively, the exterior shell external surface 134, opposite the housing internal cavity 133, may be in removable communication with the BTVA second section inner face 92. The exterior shell 132 provides for a housing opening 136, wherein the housing opening 136 allows for transfer of fuel, both liquid fuel 115 and vapor fuel 124, between the internal cavity 8 and the housing internal cavity 133. The pump 100 is positioned on a second embodiment of a fuel acquisition cushion 125', wherein the second embodiment of a fuel acquisition cushion 125' provides for transfer of liquid fuel 115 within the housing internal cavity 133 to the pump 100. Alternatively, the pump 100 may be positioned in the housing internal cavity 133 absent the fuel acquisition cushion 125'. The second pump position 135' provides for ease of maintenance on the pump 100. In the first pump position 135, maintenance on the pump 100 requires removal of at least substantially all the liquid fuel 115 from the fuel tank 4 prior to conducting maintenance upon the pump 100. However, in the second pump position 135', due to the communication between the BTVA second section inner face 92 and the housing 130, maintenance on the pump 100 requires the mere removal of the BTVA from communication with the access panel 12. Once the BTVA is removed from communication with the access panel 12, the housing 130 is removed from the fuel tank 4 as well, allowing for maintenance upon the pump 100. The second pump position 135' does not require removal of at least substantially all the liquid fuel 115 from the fuel tank 4 prior to maintenance upon the pump 100.

Figure 11A:
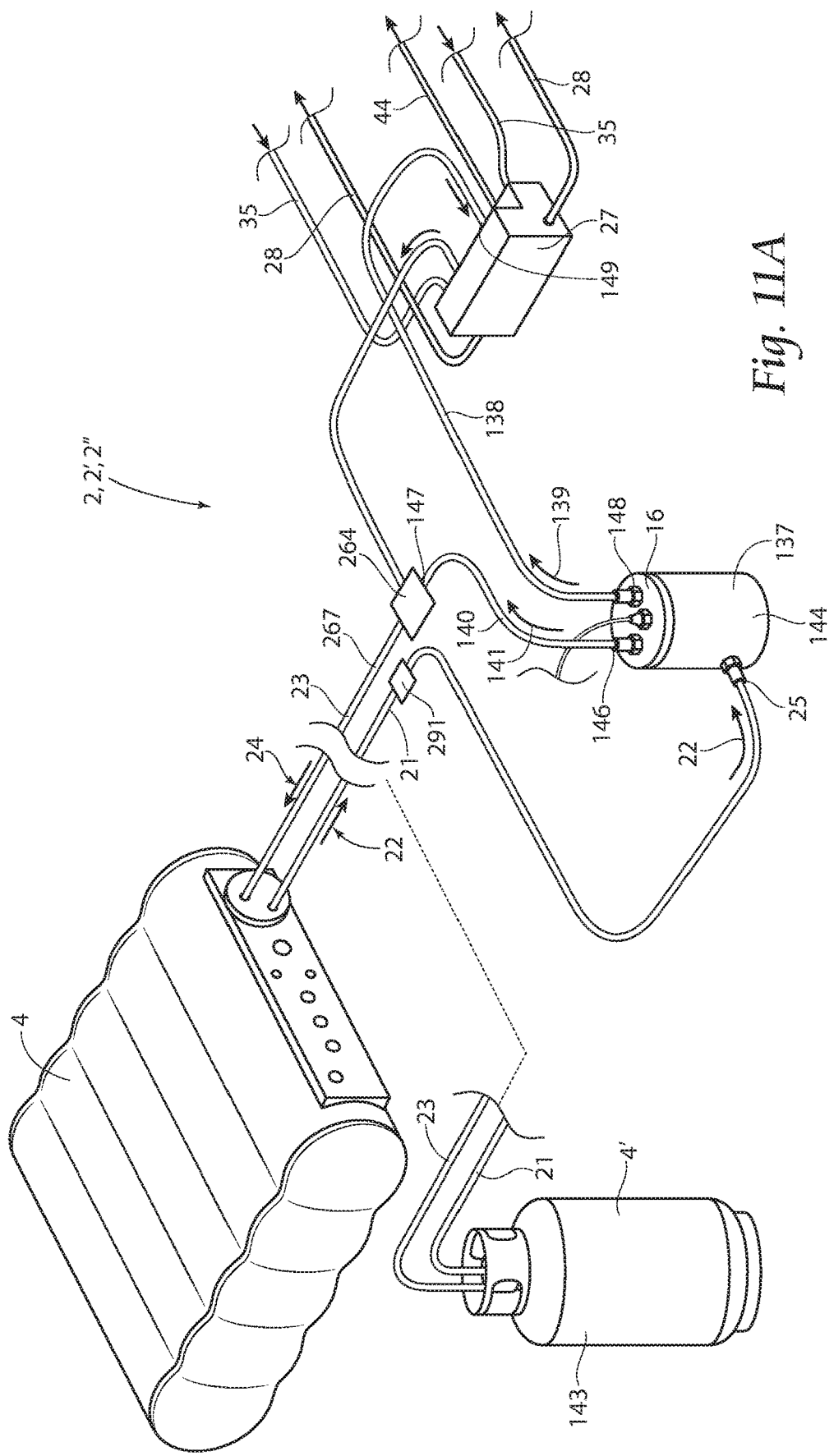
FIG. 11A is a system view of at least one of a fuel system first embodiment, a fuel system second embodiment and a fuel system third embodiment applying the external pump assembly.
Figure 11B:
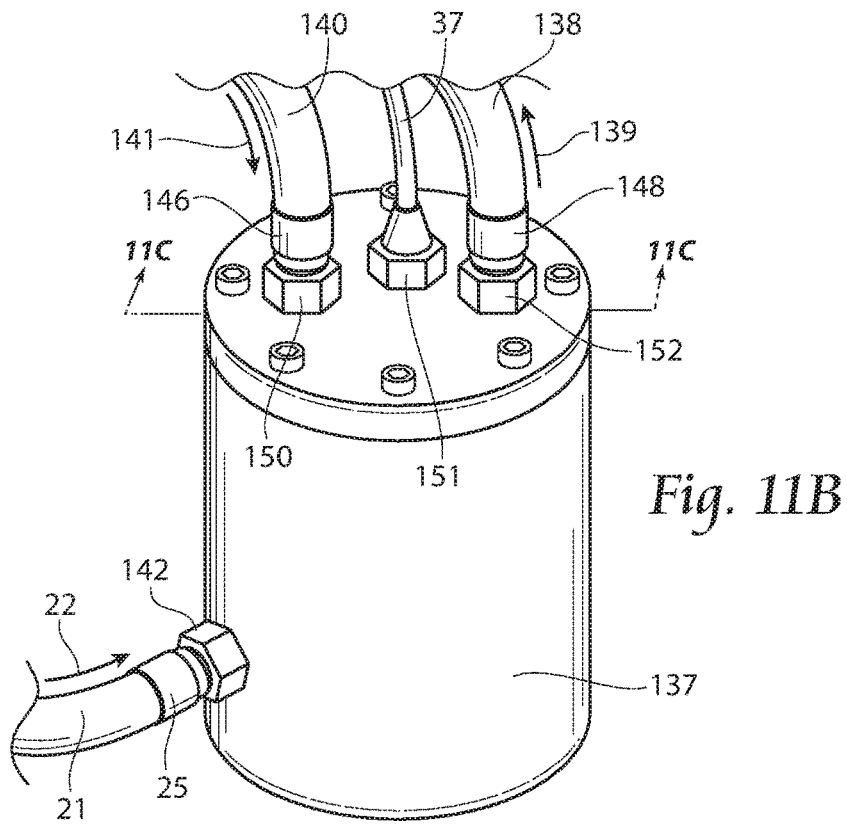
FIG. 11B is a perspective view of the external pump assembly.
Figure 11C:
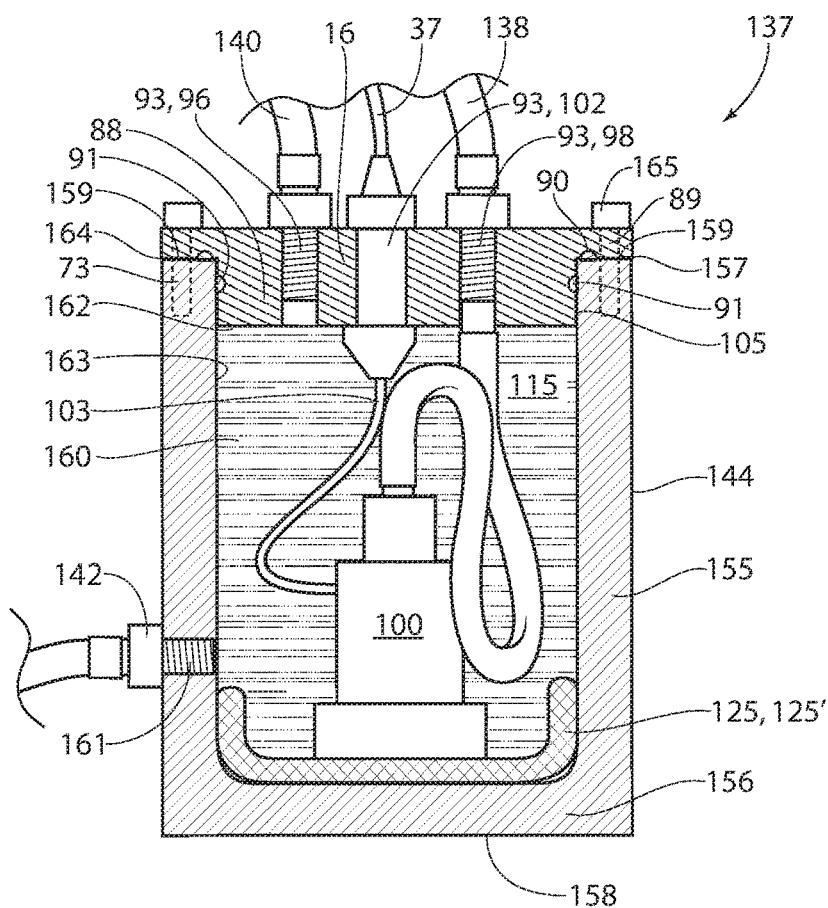
FIG. 11C is a cross-section of the external pump assembly.

With attention to FIGS. 11A, 11B and 11C, an external pump assembly 137 is disclosed as applied to at least one of at least one of the fuel system first embodiment 2, the fuel system second embodiment 2' and the fuel system third embodiment 2". It is understood the external pump assembly 137 may be incorporated in addition with the pump 100 within the fuel tank 4. Alternatively, the external pump assembly 137 may be incorporated to the exclusion of the pump 100 within the fuel tank 4. Where the external pump assembly 137 is incorporated to the exclusion of the pump 100 within the fuel tank 4, a fuel tank second embodiment 4' may be incorporated. A fuel tank second embodiment 4' may include but is not exclusive to a propane tank 143. In at least one of the fuel system first embodiment 2, the fuel system second embodiment 2' and the fuel system third embodiment 2", the external pump assembly 137 may be applied. Specifically, it is understood the system third embodiment 2" of the invention may comprise a port fuel liquid propane injection system 3 and a direct injection system 57 wherein an external pump assembly 137 is applied to the direct injection system 57. The supply line second end 25 is connected to the external pump assembly 137, wherein fuel is transferred from the fuel tank 4 into the supply line 21, through the supply line 21 and into the external pump assembly 137. The external pump assembly 137 comprises an external pump cylinder 144 and the BTVA 16. The BTVA 16 is in sealable communication with the external pump cylinder 144. A control valve 148 of an external pump/distribution block line 138 is in communication with the second bore 98. The control valve 148 is a solenoid controlled by the ECU 36 from the pump 100. The second bore 98 provides for communication of the external pump/distribution block line 138 to the pump 100 within the external pump assembly 137. An external pump/distribution block line second end 149, opposite the control valve 148, of the external pump/distribution block line 138 is connected to the distribution block 27, wherein fuel travels in a fifth direction 139 from the external pump assembly 137 through the external pump/distribution block line 138 and into the distribution block 27. An overflow line first end 146, a first check valve, of an overflow line 140 is in communication with the first bore 96. An overflow line second end 147, opposite the overflow line first end 146, the first check valve, is in communication with a second check valve 264. Wherein fuel travels in a sixth direction 141 from the external pump assembly 137 through the overflow line 140 and through the second check valve 264, into a return line second section 267, which is part of the return line 23, and back to the fuel tank 4. It is observed the return line 23 remains connected between the distribution block 27 and the fuel tank 4, wherein fuel also returns from the distribution block in a second direction 24 through the return line 23 and into the fuel tank 4. The second check valve 264 may be attached to the return line 23, allowing for the combination of the fuel returning from the external pump assembly 137 in the overflow line 140 with the fuel returning from the distribution block in the return line 23. Following the second check vale 264, the combination of the fuel returning from the external pump assembly 137 in the overflow line 140 with the fuel returning from the distribution block in the return line 23 returns to the fuel tank 4 within the return line second section 267.

It is observed at least one of the fuel system first embodiment 2, fuel system second embodiment 2', and fuel system third embodiment 2" incorporates at least one of a first in line filter 291 along the at least one supply line 21.

As illustrated in FIGS. 11B and 11C, the overflow line 140 is in removable communication with the BTVA 16 through the first pill 150. Alternatively, the overflow line 140 is in fixed communication with the BTVA 16 through the first pill 150. The external pump/distribution block line 138 is in removable communication with the BTVA 16 through the supply solenoid control manual shut-off valve 152. Alternatively, the external pump/distribution block line 138 is in fixed communication with the BTVA 16 through the supply solenoid control manual shut-off valve 152. ECU/pump communication 37 is in removable communication with the BTVA 16 through the third bore fastener 151. Alternatively, the ECU/pump communication 37 is in fixed communication with the BTVA 16 through the third bore fastener 151. The ECU 36 controls the pump 100 and a solenoid electrical harness (not illustrated in the figures). The supply line second end 25 is in removable communication with the external pump assembly 137 through a fourth bore fastener 142 in sealable communication with a fourth bore 161. The fourth bore fastener 142 may be a one-way check valve. Alternatively, the fourth bore fastener 142 may be other than a one-way check valve.

As further illustrated in FIG. 11C, external pump assembly 144 comprises the external pump cylinder 144 and the BTVA 16 in sealable communication. The BTVA 16 provides for the same elements as described for the BTVA 16 previously in this invention, further the components attached to the BTVA 16, including but not limited to the pump 100 and the electrical extension 103, provide for the same elements and features as previously described in this invention. The external pump cylinder 144 comprises an external cylinder wall 155 defined by an external cylinder first end 156 and an external cylinder second end 157. The external cylinder first end 156 is a closed end 158, wherein in the closed end 158 is nonporous. Further, the external cylinder first end 156 preferably comprises a concave surface with respect to an external cylinder cavity 160. Alternatively, the external cylinder first end 156 may comprise a convex surface with respect to an external cylinder cavity 160. Alternatively, the external cylinder first end 156 may comprise a flat surface with respect to an external cylinder cavity 160. The oppositely opposed external cylinder second end 157 is defined by a finality 159 of the external cylinder wall 155, wherein the external cylinder second end 157 provides for an opening 162 defined by the internal cylinder wall 163 of the external cylinder wall 155. It is noted the finality 159 extends at least substantially about the perimeter 164 of the external cylinder second end 157. The combination of the external cylinder wall 155, the external cylinder first end 156 and the external cylinder second end 157 define the external cylinder cavity 160.

The BTVA 16 is complimented with and in sealable communication with the external cylinder second end 157, wherein the BTVA second section 88 is inserted into the external cylinder cavity 160. The BTVA second section 88 is in sealable communication with the internal cylinder wall 163. The sealable communication between the BTVA second section 88 and the internal cylinder wall 163 is provided by the close communication of the second seal 91 of the BTVA second section 88, wherein the second seal 91 is positioned at least substantially about second section perimeter 105 at a predetermined location between the BTVA first section and the BTVA second section inner face 92, and the internal cylinder wall 163 of the external cylinder wall 155. Sealable communication between the BTVA 16 and the external cylinder second end 157 is further provided by the first seal 90 which is positioned on the BTVA first side 18 and at least substantially about the second section perimeter 105. Wherein the first seal 90 communicates with the finality 159, when the BTVA 16 and external cylinder second end 157 are complemented, to provide for sealable communication.

The finality 159 provides for at least one mount hole 73 about the perimeter 164. At least one of the BTVA mounting holes 89 is in alignment with at least one mount hole 73 about the perimeter 164 wherein the communication of the at least one of the BTVA mounting holes 89 and at least one mount hole 73 provides for complementing the BTVA 16 with the external pump cylinder 144. At least one mounting bolt 165 is in insertable and removable communication with the aligned at least one BTVA mounting holes 89 and at least one mount hole 73.

Insertion of the BTVA second section 88 into the external cylinder cavity 160 provides for insertion of the pump 100 and pump connection 99, and the electrical extension 103 into the external cylinder cavity 160. The pump 100 preferably rests upon or in close proximity to the closed end 158. The pump 100 preferably is in communication with a fuel acquisition cushion (125, 125'). Operation of the BTVA 16 and associated components in the external fuel pump are as described for the BTVA 16 as installed into a fuel tank 4.

Figure 12A:
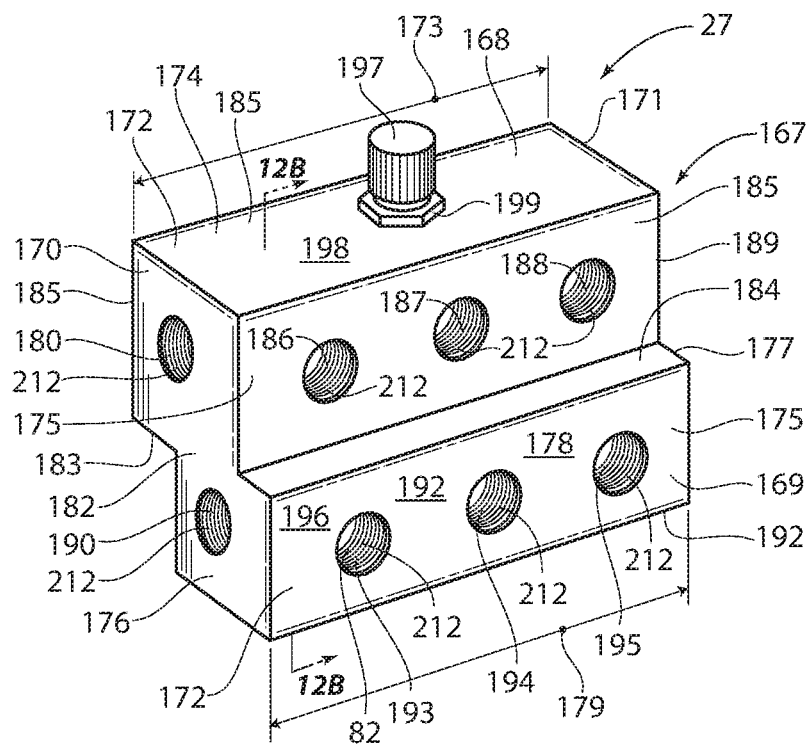
FIG. 12A is a perspective view of a distribution block.

With attention to FIGS. 12A, 12B, 12C, 12D 12E, 12F and 12G, the distribution block 27 is further disclosed. As illustrated in FIG. 12A, the distribution block 27 is a three dimensional structure 167 comprising a first member 168 and a second member 169. The first member 168 comprising a first member first side 170 and an oppositely opposed first member second side 171 separated by a first member body 174. The first member body 174 having at least three sides 172, wherein the at least three sides 172 extend a first member length 173 from the first member first side 170 to the first member second side 171. The combination of the first member first side 170, the first member second side 171 and the first member body 174 comprises the first member 168, wherein the first member 168 is a prism 175.

The second member 169 comprising a second member first side 176 and an oppositely opposed second member second side 177 separated by a second member body 178. The second member body 178 having at least three sides 172, wherein the at least three sides 172 extend a second member length 179 from the second member first side 176 to the second member second side 177. The combination of the second member first side 176, the second member second side 177 and the second member body 178 comprises the second member 169, wherein the first second member 169 is a prism 175.

The first member 168 and the second member 169 are in communication 182 along atleast substantially the first member length 173 of a first member body first side 183 and at least substantially the second member length 179 of a second member body first side 184. Alternatively, the first member 168 and the second member 169 are in communication 182 along less than substantially the first member length 173 of a first member body first side 183 and less than substantially the second member length 179 of a second member body first side 184.

The first member first side 170 provides for at least one first distribution block bore 180. The first member second side 171 provides for at least one second distribution block bore 181. At least one first member body side 185 provides for at least one third distribution block bore 186. At least one first member body side 185 provides for at least one fourth distribution block bore 187. At least one first member body side 185 provides for at least one fifth distribution block bore 188.

Preferably, the third distribution block bore 186, the fourth distribution block bore 187 and the fifth distribution block bore 188 are positioned along the first member length 173 wherein the fourth distribution block bore 187 is positioned between the third distribution block bore 186 and the fifth distribution block bore 188. Preferably, each of the third distribution block bore 186, the fourth distribution block bore 187 and the fifth distribution block bore 188 are positioned on a first member body second side 189.

The second member first side 176 provides for at least one sixth distribution block bore 190. The second member second side 177 provides for at least one seventh distribution block bore 191. At least one second member body side 192 provides for at least one eighth distribution block bore 193. At least one second member body side 192 provides for at least one ninth distribution block bore 194. At least one second member body side 192 provides for at least one tenth distribution block bore 195.

Preferably, the eighth distribution block bore 193, the ninth distribution block bore 194 and the tenth distribution block bore 195 are positioned along the second member length 179 wherein the ninth distribution block bore 194 is positioned between the eighth distribution block bore 193 and the tenth distribution block bore 195. Preferably, each of the eighth distribution block bore 193, the ninth distribution block bore 194 and the tenth distribution block bore 195 are positioned on a second member body second side 196.

Figure 12B:
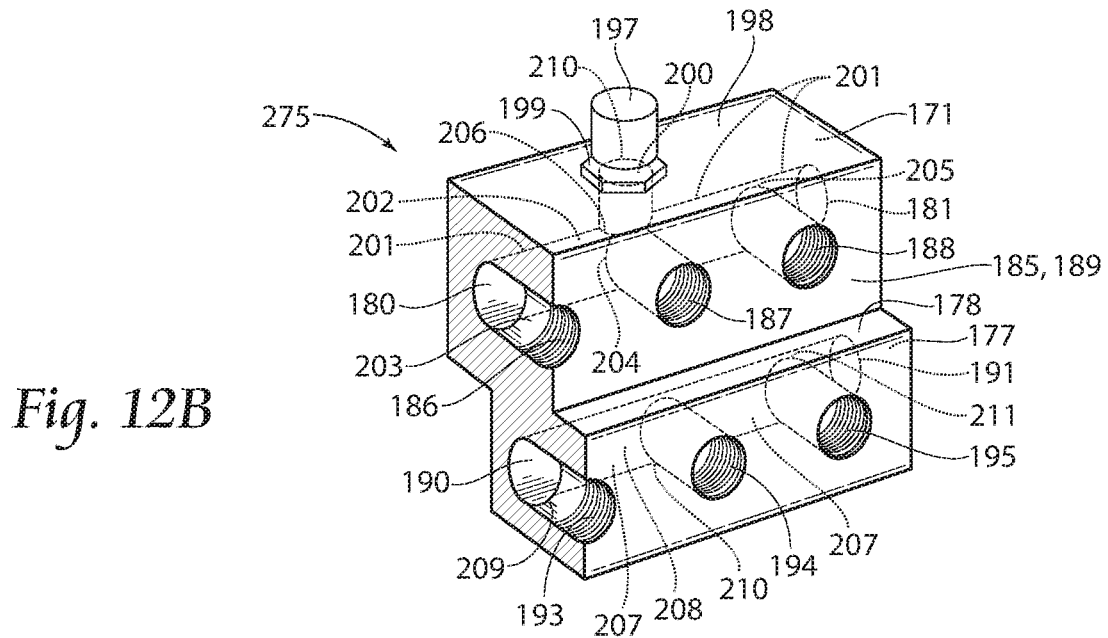
FIG. 12B is a cross-section of a first embodiment of the distribution block, illustrating internal bore channels of the distribution block.

At least one of a test bore cap 197 and a test port nut 199 may be positioned over a test bore 200 (reference FIG. 12B). At least one of the test bore cap 197 and the test bore nut 199 are in removable communication with the test bore 200. The test bore 200 is positioned on a first member body third side 198.

As illustrated in FIG. 12B, the first distribution block bore 180 is in fixed communication a first member body bore channel 201. The first member body bore channel 201 providing for a first member body bore channel cavity 202 extending through the first member body 174 from at least a substantial proximity to the first member first side 170 to a substantial proximity to the first member second side 171. Wherein fuel may transfer through the first distribution block bore 180 and into the first member body bore channel 201. The second distribution block bore 181 is in fixed communication a first member body bore channel 201, opposite the communication between the first distribution block bore 180 and the first member body bore channel 201. Wherein fuel may transfer through the first distribution block bore 180 and into the first member body bore channel 201.

The third distribution block bore 186 intersects the first member body bore channel 201 at a third distribution block bore/first member body bore channel intersection 203, wherein fuel may travel through the third distribution block bore/first member body bore channel intersection between the third distribution block bore 186 and the first member body bore channel 201. The fourth distribution block bore 187 intersects the first member body bore channel 201 at a fourth distribution block bore/first member body bore channel intersection 204, wherein fuel may travel through the fourth distribution block bore/first member body bore channel intersection between the fourth distribution block bore 187 and the first member body bore channel 201. The fifth distribution block bore 188 intersects the first member body bore channel 201 at a fifth distribution block bore/first member body bore channel intersection 205, wherein fuel may travel through the third distribution block bore/first member body bore channel intersection 205 between the fifth distribution block bore 188 and the first member body bore channel 201. The test bore 200 intersects the first member body bore channel 201 at a test bore/first member body bore channel intersection 206, wherein fuel may travel through the test bore/first member body bore channel intersection 206 between the test bore 200 and the first member body bore channel 201. The test bore provides for an ability to test the pressure of the system (2, 2', 2") while in the field, and does not require interaction with the ECU 36 during the testing.

The sixth distribution block bore 190 is in fixed communication a second member body bore channel 207. The second member body bore channel 207 providing for a second member body bore channel cavity 208 extending through the second member body 178 from at least a substantial proximity to the second member first side 176 to a substantial proximity to the second member second side 177. Wherein fuel may transfer through the second member body bore channel 207 and into the sixth distribution block bore 190. The seventh distribution block bore 191 is in fixed communication with the second member body bore channel 207, opposite the communication between the sixth distribution block bore 190 and the second member body bore channel 207. Wherein fuel may transfer through the second member body bore channel 207 and into the seventh distribution block bore 191.

The eighth distribution block bore 193 intersects the second member body bore channel 207 at an eighth distribution block bore/second member body bore channel intersection 209, wherein fuel may travel through the eighth distribution block bore/second member body bore channel intersection 209 between the eighth distribution block bore 193 and the second member body bore channel 207. The ninth distribution block bore 194 intersects the second member body bore channel 207 at a ninth distribution block bore/second member body bore channel intersection 210, wherein fuel may travel through the ninth distribution block bore/second member body bore channel intersection 210 between the ninth distribution block bore 194 and the second member body bore channel 207. The tenth distribution block bore 195 intersects the second member body bore channel 207 at a tenth distribution block bore/second member body bore channel intersection 211, wherein fuel may travel through the tenth distribution block bore/second member body bore channel intersection 211 between the tenth distribution block bore 195 and the second member body bore channel 207.

It is observed at least one of the first distribution block bore, the second distribution block bore 181, the third distribution block bore 186, the fourth distribution block bore 187, the fifth distribution block bore 188, the test bore 200, the sixth distribution block bore 190, the seventh distribution block bore 191, the eighth distribution block bore 193, the ninth distribution block bore 194 and the tenth distribution block bore 195 may provide at least one groove 82 about the distribution block bore circumference 212 of the respective bore.

It is observed FIG. 12B illustrates a first embodiment of the distribution block, 275. It is observed FIG. 12G, to be described, illustrates a second embodiment of the distribution block, 277. It is observed at least one element of the first embodiment of the distribution block 275 may be complimented with at least one element of the second embodiment of the distribution block 270.

Figure 12C:
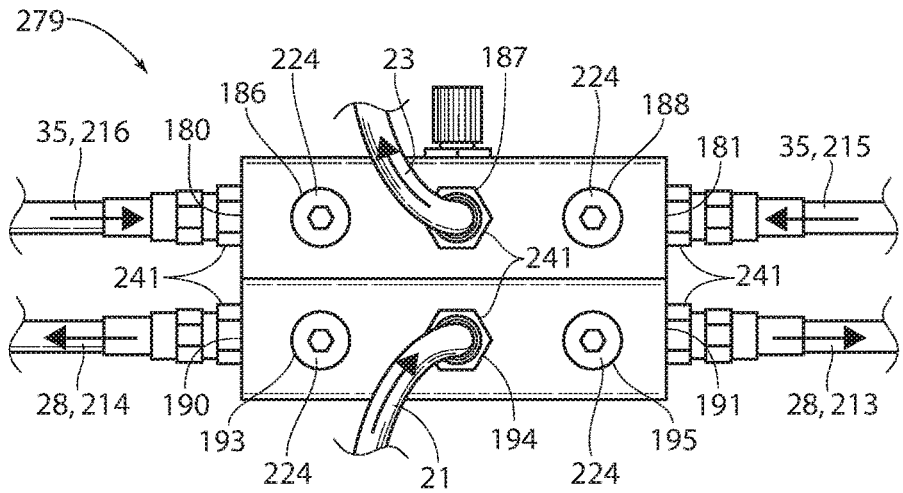
FIG. 12C is a front view of a first distribution block configuration.

As illustrated in FIG. 12C, a front view of a first distribution block configuration 279, a left side distribution block to rail tube (214, 28) is in removable communication, thru a fitting 241, with the sixth distribution block bore 190, wherein fuel travels thru the sixth distribution block bore 190 and into the left side distribution block to rail tube (214, 28), thru the left side distribution block to rail tube (214, 28) and subsequently to a left side fuel rail (FIG. 1; 30). A left side fuel rail to distribution block tube (216, 35) is in removable communication, thru a fitting 241, with the first distribution block bore 180, wherein fuel travels thru the left side fuel rail to distribution block tube (216, 35) and into the first distribution block bore 180.

A right side distribution block to rail tube (213, 28) is in removable communication, thru a fitting 241, with the seventh distribution block bore 191, wherein fuel travels thru the seventh distribution block bore 191 and into the right side distribution block to rail tube (213, 28), thru the right side distribution block to rail tube (213, 28) and subsequently to a right side fuel rail (FIG. 1; 30). A right side fuel rail to distribution block tube (215, 35) is in removable communication, thru a fitting 241, with the second distribution block bore 181, wherein fuel travels thru the right side fuel rail to distribution block tube (215, 35) and into the second distribution block bore 181.

Figure 12D:
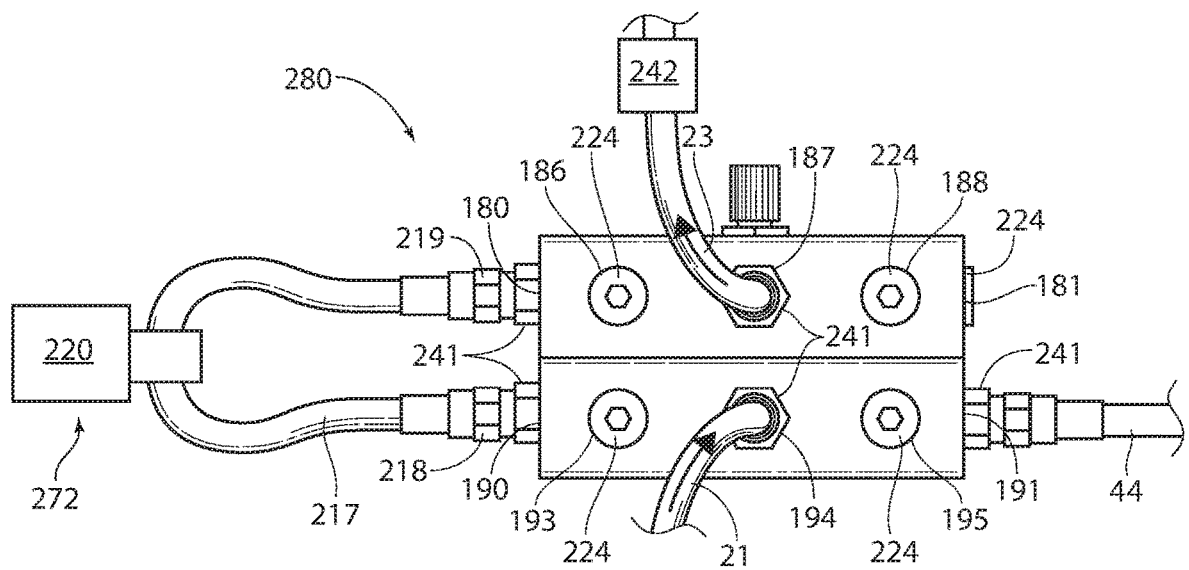
FIG. 12D is a front view of a second distribution block configuration.

As illustrated in FIG. 12D, a front view of a second distribution block configuration 280, the distribution block to common rail tube 44 is in removable communication, thru a fitting 241, with the seventh distribution block bore 191, wherein fuel travels thru the seventh distribution block bore 191 and into the distribution block to common rail tube 44, thru the distribution block to common rail tube 44 and subsequently to the common fuel rail 42. A plug 224 in inserted into the second distribution block bore 181, wherein the plug 224 provides sealed communication with the second distribution block bore 181. A recirculating tube 217 contains a recirculating tube first end 218 and a recirculating tube second end 219. The recirculating tube first end 218 is in removable communication, thru a fitting 241, the sixth distribution block bore 190. The recirculating tube second end 219 is in removable communication, thru a fitting 241, with the first distribution block bore 180. Wherein fuel travels from the sixth distribution block bore 190, thru the recirculating tube 217, into the first distribution block bore 180, subsequently into the fourth distribution block bore, and thru the return line 23. A recirculating line solenoid 220 may be if fitted communication with the recirculating line 217, wherein the recirculating line solenoid 220 controls a flow volume of fuel returning to the fuel tank 4. The communication of the solenoid 220 to the distribution block 27 illustrated in FIG. 12D amounts to a first embodiment of the solenoid in communication with the distribution block, 272.

Alternatively, the distribution block to common rail tube 44 may be in removable communication, thru a fitting 241, with the sixth distribution block bore 190. Further, the recirculating tube first end 218 may be in removable communication, thru a fitting 241, the seventh distribution block bore 191. The recirculating tube second end 219 may be in removable communication, thru a fitting 241, with the second distribution block bore 181.

The control of fuel flow volume is determined by at least one of the pressure and the temperature of the fuel measured in the system (2, 2', 2"). Where a pressure is at least one of lower than at least one or a calculated value and a calculated range, and a fuel temperature at least one of above a calculated value and above a calculated range, the solenoid actuates to stop the flow of fuel return to the fuel tank 4 in order to increase the pressure of the fuel. Where a pressure is at least one of above and equal to a calculated limit, and the temperature is below a calculated limit, the solenoid actuates to open the flow of fuel return to the fuel tank 4. Measurement readings of at least one of the pressure of the fuel and temperature of the fuel are may be taken continuously. Alternatively, measurement readings of at least one of the pressure of the fuel and temperature of the fuel are may be taken intermittently.

Figure 12E:
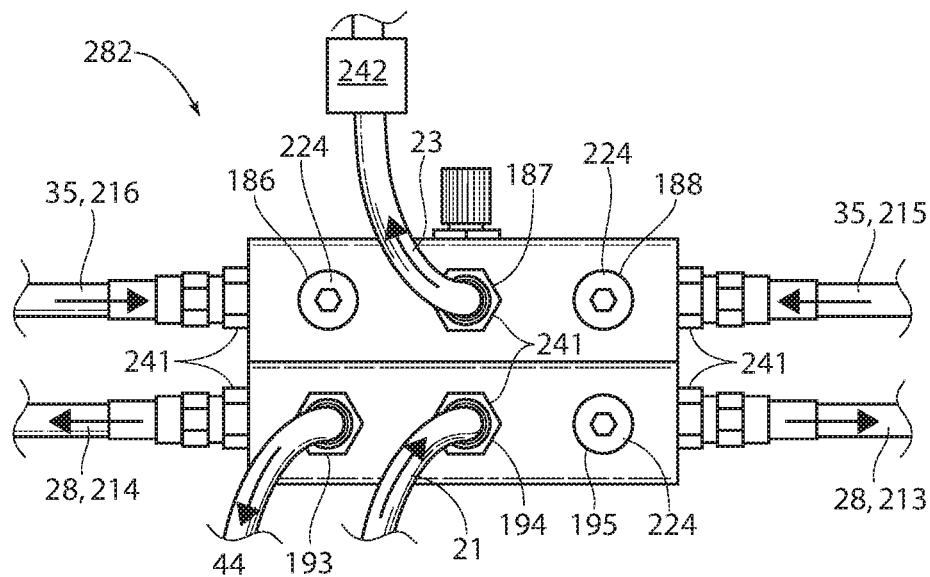
FIG. 12E is a front view of a third distribution block configuration.

As illustrated in FIG. 12E, is a front view of a third distribution block configuration 282 providing for the fuel system third embodiment of the invention 2" comprising a port fuel liquid propane injection system and a direct injection system. The components of the distribution block providing the fuel system first embodiment of the invention 2", as illustrated in FIG. 12C, are applied. The distribution block, providing for the fuel system third embodiment of the invention 2", provides for the direct injection system. The distribution block to common rail tube 44 is in removable communication, thru a fitting 241, with the eighth distribution block bore 193, wherein fuel travels thru the eighth distribution block bore 193 and into the distribution block to common rail tube 44, thru the distribution block to common rail tube 44 and subsequently to the common fuel rail 42. A plug 224 is in sealed communication with the tenth distribution block bore 195 (this plug 224 in sealed communication with the tenth distribution block bore 195 is not illustrated in FIG. 12E). Alternatively, the distribution block to common rail tube 44 may be in removable communication, thru a fitting 241, with the tenth distribution block bore 195. A plug 224 may be in sealed communication with the eighth distribution block bore 193 (this plug 224 in sealed communication with the eighth distribution block bore 193 is not illustrated in FIG. 12E).

Figure 12F:
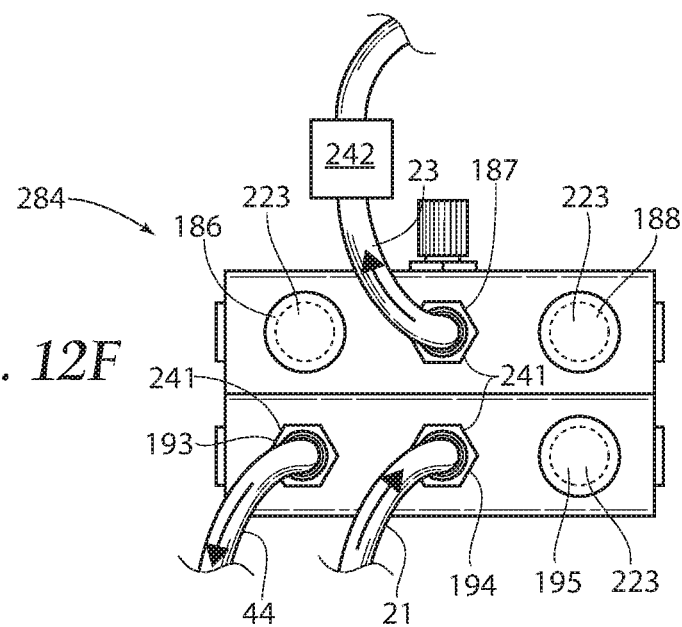
FIG. 12F is a front view of a fourth distribution block configuration additionally illustrating temperature sensor, pressure sensor and solenoid locations.

As illustrated in FIG. 12F, a front view of a fourth distribution block configuration 284 additionally illustrating temperature sensor, pressure sensor and solenoid locations, for at least one of the fuel system first embodiment of the invention 2, the fuel system second embodiment of the invention 2' and the fuel system third embodiment of the invention 2", at least one of a temperature and a pressure sensor and solenoid 223 may be in sealable communication with at least one of the third distribution block bore 186, the fifth distribution block bore 188, the eighth distribution block bore 193, and the tenth distribution block bore 195. The distribution block to common rail tube 44 is in removable communication, thru a fitting 241, with the eighth distribution block bore 193, wherein fuel travels thru the eighth distribution block bore 193 and into the distribution block to common rail tube 44, thru the distribution block to common rail tube 44 and subsequently to the common fuel rail 42. It is observed the configuration illustrated in FIG. 12F with the distribution block to common rail tube 44 is in removable communication, thru a fitting 241, with the eighth distribution block bore 193 provides for the distribution block configuration for the fuel system second embodiment 2' of the invention comprising a direct injection system 57 as described in FIG. 2. The fourth distribution block configuration 284 may be applied with a pulsed width modulation pump in at least one of the fuel system second embodiment of the invention 2' and the fuel system third embodiment of the invention 2".

As previously described in the description of the recirculating line solenoid 220, at least one of the temperature sensor and the pressure sensor 223 monitor pressure and temperature conditions of the fuel within the system (2, 2', 2"). As described with the recirculating line solenoid 220, the at least one solenoid 223 controls the fuel flow volume based upon at least one of calculated temperature measurements and calculated pressure measurements. Alternatively, at least one flow control fitting, 'second pill', 242 may be in communication with the at least one return line 23. As described with the recirculating line solenoid 220, the flow control fitting 242 controls the fuel flow volume returning to the fuel tank 4 based upon at least one of calculated temperature measurements and calculated pressure measurements. A combination of at least one the recirculating line solenoid 220, the at least one solenoid 223, and the at least one flow control fitting 242 may be employed to control the fuel flow volume within the system (2, 2', 2").

In the configurations of the distribution block 27 illustrated in FIGS. 12C, 12D, 12E, 12F, the first embodiment of the distribution block 275, and the second embodiment of the distribution block 270, and any combination of the elements of the configurations as illustrated in FIGS. 12C, 12D, 12E, 12F, the first embodiment of the distribution block 275, and the second embodiment of the distribution block 270, the at least one supply line 21 is in removable communication with the ninth distribution block bore 194, thru a fitting 241, and the at least one return line 23 is in removable communication with the fourth distribution block bore 187, thru a fitting 241. Wherein fuel travels thru the at least one supply line 21 and into the ninth distribution block bore 194. Wherein fuel travels from the fourth distribution block bore 194 and into the at least one return line 23.

Figure 12G:
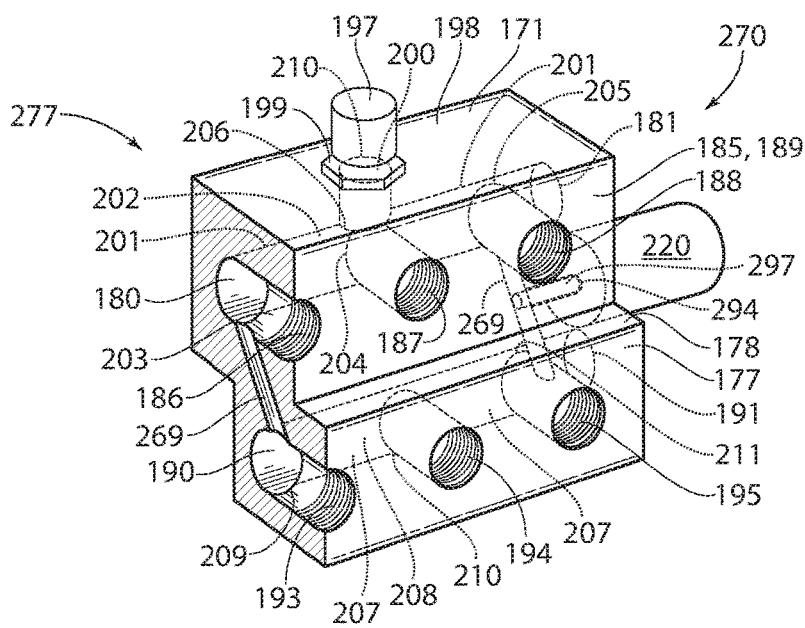
FIG. 12G is a cross-section of a second embodiment of the distribution block.

With respect to FIG. 12G, a second embodiment of the solenoid in communication with the distribution block 27, 270 is described. In this second embodiment of the solenoid 220 in communication with the distribution block 27 a bypass port 269 is illustrated. The bypass port 269 connects at least one of the first distribution block bore 180, the third distribution block bore 186, the fourth distribution block bore 187, the fifth distribution block bore 188, the second distribution block bore 181, and the first member body bore channel 201 to at least one of the sixth distribution block bore 190, the seventh distribution block bore 191, the eighth distribution block bore 193, the ninth distribution block bore 194, the tenth distribution block bore 195, and the second member body bore channel 207. A solenoid channel 294 provides a fluid connection between the bypass port 269 and at least one of the first member first side 170, the first member second side 171, at least one side of the at least three sides 172 of the first member body 174, the second member first side 176, the second member second side 177, and at least one side of the at least three sides 172 of the second member body 178. A solenoid 220 in removable communication with the solenoid channel 294 at the at least one of the first member first side 170, the first member second side 171, at least one side of the at least three sides 172 of the first member body 174, the second member first side 176, the second member second side 177, and at least one side of the at least three sides 172 of the second member body 178. Alternatively, the solenoid 220 affixed to the solenoid channel 294. A solenoid pin 297, positioned in the solenoid channel 294 and into the bypass port 269, wherein the solenoid pin 297 is removable from the bypass port 269. When inserted in the bypass port 269, the solenoid pin 297 provides for at least partial blocking of the flow of fuel between the first member 168 and the second member 169. This provides for flow control of the fuel returning to the fuel tank 4 as described in the first embodiment of the solenoid in communication with the distribution block 272.

In the configurations of the distribution block 27 illustrated in FIGS. 12C, 12D, 12E, 12F, and any combination of the elements of at least one of the first distribution block configuration 279, the second distribution block configuration 280, the third distribution block configuration 282, and the fourth distribution block configuration 284 may be applied to at least one of the first embodiment of the distribution block 275 and the second embodiment of the distribution block 270.

Figure 13:
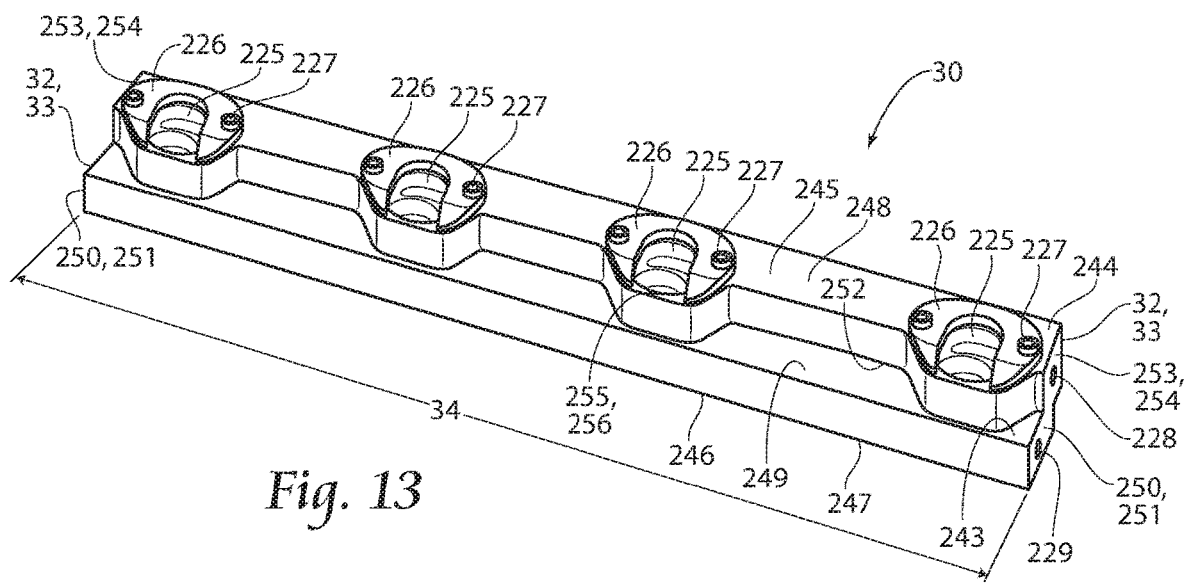
FIG. 13 is a perspective view of a fuel rail.

With attention to FIGS. 13-17, the fuel rail 30 is further described. As illustrated in FIG. 13, a perspective view of a fuel rail 30, comprising the fuel rail first end 32 and the oppositely opposed fuel rail second end 33, wherein the fuel rail first end 32 and the fuel rail second end 33 are separated by a fuel rail length 34. The fuel rail 30 comprising a first elevation 243 and a second elevation 244. The first elevation 243 comprising a first elevation first side 247 and an oppositely opposed first elevation second side 249, wherein the first elevation first side 247 and the first elevation second side 249 extend between a first elevation first end 250 and a first elevation second end 251. The combination of the first elevation first side 247, the first elevation second side 249, the first elevation first end 250 and the first elevation second end 251 provides for the first elevation 243. The second elevation 244 comprising a second elevation first side 252 and an oppositely opposed second elevation second side 248, wherein the second elevation first side 252 and the second elevation second side 248 extend between a second elevation first end 253 and a second elevation second end 254. The combination of the second elevation first side 252, the second elevation second side 248, the second elevation first end 253 and the second elevation second end 254 provides for the second elevation 244.

The first elevation second side 249 and the second elevation first side 252 are in fused communication along the fuel rail length 34 to comprise the fuel rail 30. The first elevation 243 and the second elevation 244 extend the fuel rail length 34. Alternatively, a; least one of the first elevation 243 and the second elevation 244 extends the fuel rail length 34. The first elevation first side 247 comprises the fuel rail first side 246. The second elevation second side 248 comprises the fuel rail second side 245.

A first rail bore 229 extends thru the first elevation 243 along the fuel rail length 34 from the first elevation first end 250 to the first elevation second end 251. A second rail bore 228 extends thru the second elevation 244 along the fuel rail length 34 from the second elevation first end 253 to the second elevation second end 254.

At least one fuel injector cavity 225 is positioned along the fuel rail length 34. Wherein the fuel injector cavity 225 extends from the fuel rail second side 245 to the fuel rail first side 246. The at least one fuel injector cavity 225 is defined by an injector cavity second side opening 255, which provides for access into the and through the fuel rail 30 from the fuel injector second side 245 to the fuel injector first side 246. About an injector cavity second side opening cavity circumference 256 resides a retainer 226.

Figure 14:
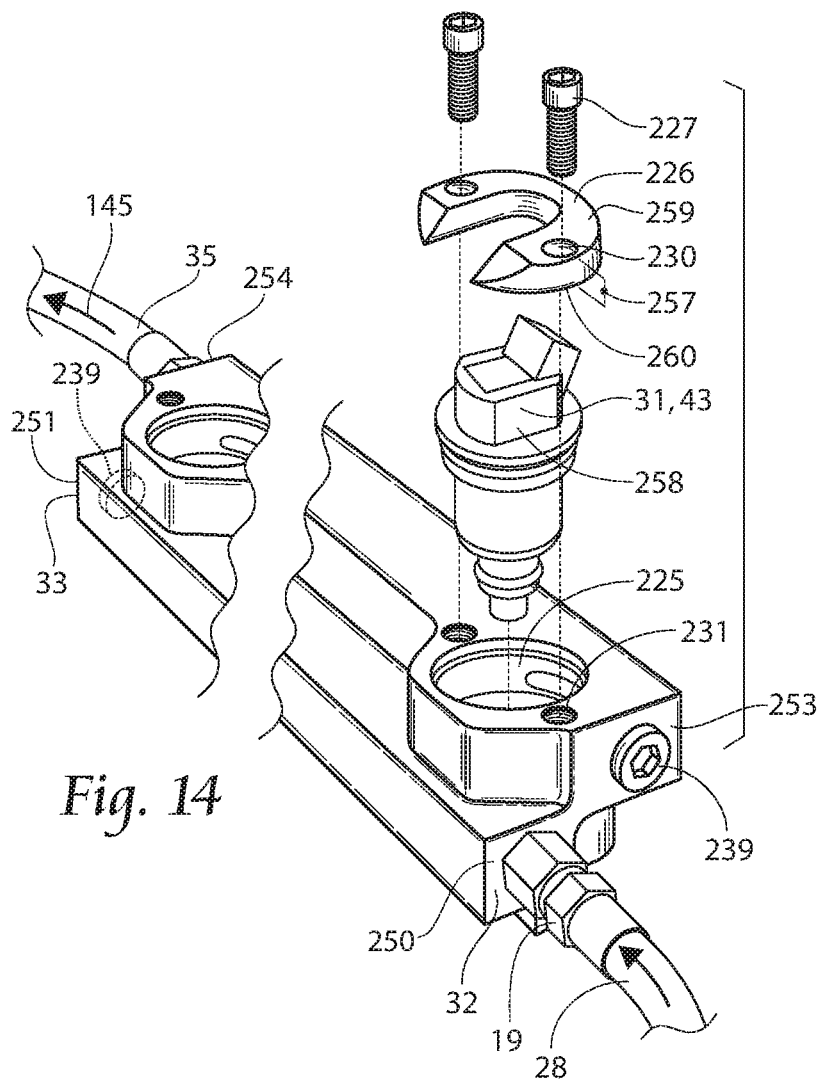
FIG. 14 is a perspective view of a fuel rail in exploded communication with a fuel injector.

As illustrated in FIG. 14, a perspective view of a fuel rail in exploded communication with a fuel injector, the distribution block to fuel rail tube 28 is in removable communication with the fuel rail first end 32 and specifically the first rail bore 229 opening at the first elevation first end 250, wherein fuel is provided to enter into the fuel rail 30. The first rail bore 229 provides for fuel to enter into the fuel rail 30. The first fuel rail bore 229 may provide for fuel to exit the fuel rail 30. Alternatively, the first fuel rail bore 229 may provide for fuel to enter and exit the fuel rail 30. A fuel rail plug 239 is in sealable communication with the fuel rail second end 33 and specifically the first rail bore 229 opening at the first elevation second end 251. The fuel rail to distribution block tube 35 is in removable communication with the fuel rail second end 33 and specifically the second rail bore 228 opening at the second elevation second end 254, wherein fuel is provided to travel in a fourth direction 145 exiting the fuel rail 30. The second rail bore 228 provides for fuel to exit the fuel rail 30. The second fuel rail bore may provide for fuel to enter the fuel rail 30. Alternatively, the second fuel rail bore 228 may provide for fuel to enter and exit the fuel rail 30. A fuel rail plug 239 is in sealable communication with the fuel rail second end 33 and specifically the second rail bore 228 opening at the second elevation first end 253.

At least one of port injection fuel injector assembly 31 and a port injection fuel injector 43 is placed into the fuel injector cavity 225. At least one of the injector cavity second side openings 255 provides for at least one threaded bore hole 231 about the injector cavity second side opening circumference 256. Atleast one retainer 226 provides for atleast one u-shaped member bore hole 230. The at least one retainer 226 extends a retainer thickness 257, wherein the at least one u-shaped member bore hole 230 provides access from a retainer first surface 259 top a retainer second surface 260. With the at least one of port injection fuel injector assembly 31 and a port injection fuel injector 43 is placed into the fuel injector cavity 225, the retainer 226 is positioned about a port fuel injector head 258. The retainer 226 is positioned such that at least one u-shaped member bore hole 230 is in alignment with at least one at least one threaded bore hole 231. A fastening member 227 is inserted thru the u-shaped member bore hole 230 and into the at least one threaded bore hole 231 to provide for a pressure fit to maintain the position of the at least one of port injection fuel injector assembly 31 and a port injection fuel injector 43.

Figure 15:
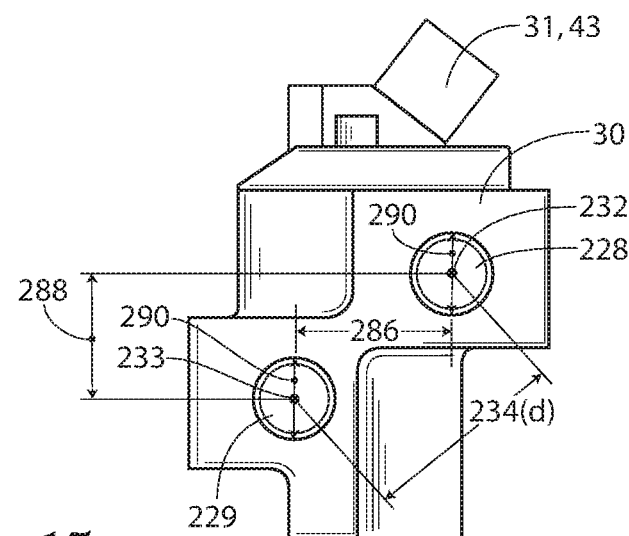
FIG. 15 is a side view of a fuel rail.

As illustrated in FIG. 15, a side view of a fuel rail, the second rail bore 228 is provided with a second rail bore center line 232 extending the length of the second elevation 244. The first rail bore 229 is provided with a first rail bore center line 233 extending the length of the first elevation 243. The first rail bore center line 233 and the second rail bore center line 232 maintain a substantially constant center line separation distance 234(d) throughout the fuel rail length 34. The substantially constant center line separation distance 234(d) is further defined by a separation width 286 between the first rail bore center line 233 and second rail bore center line 232, and a separation height 288 between the first rail bore center line 233 and second rail bore center line 232.

Figure 16:
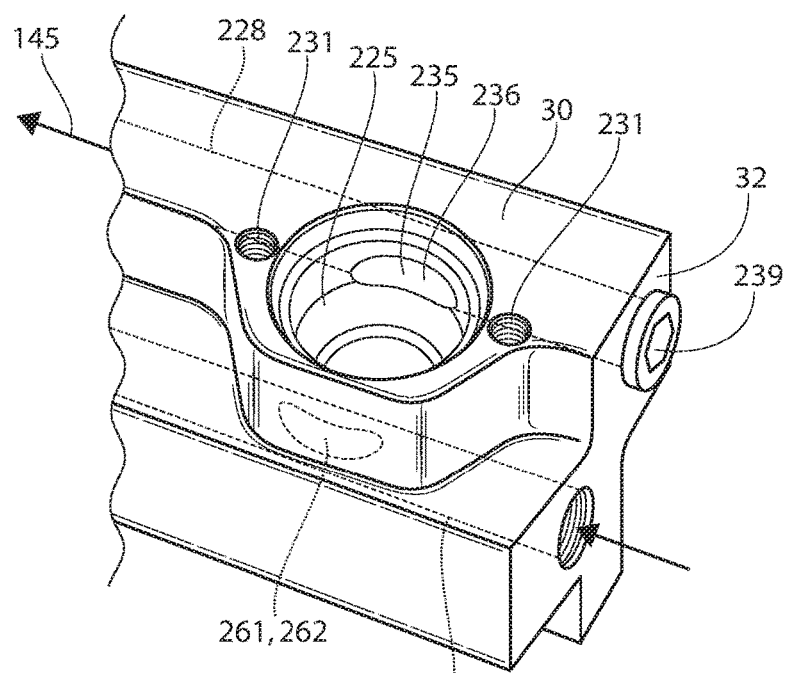
FIG. 16 is a perspective view of a fuel rail illustrating the fuel injector cavity.
Figure 17:
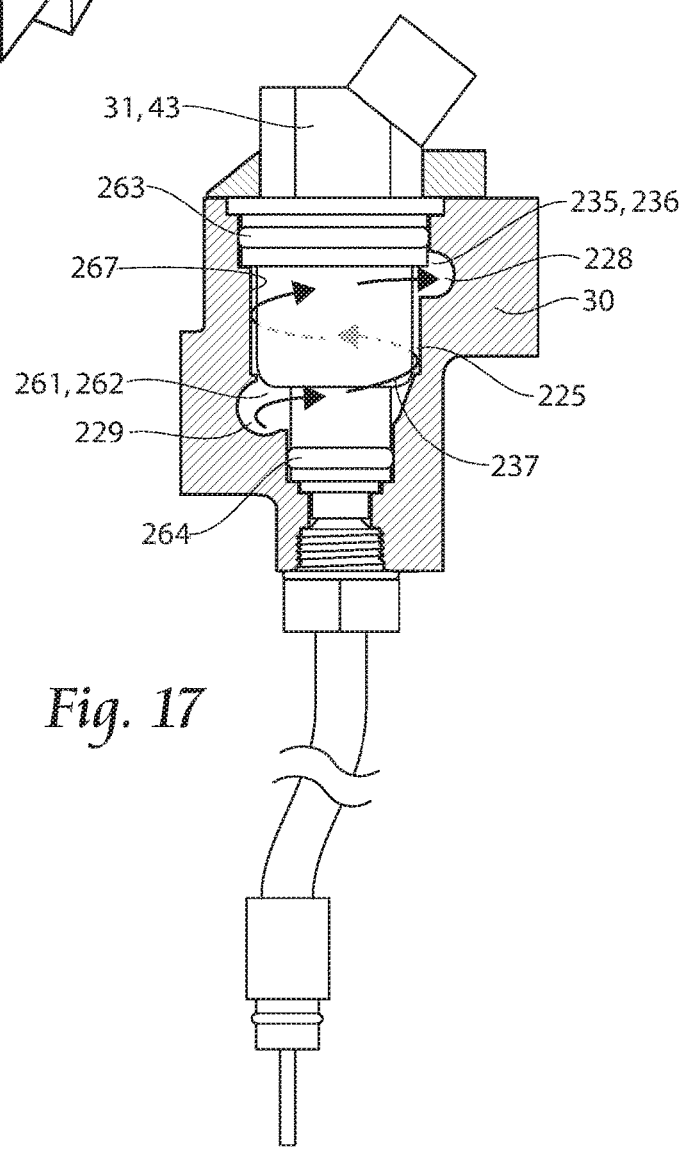
FIG. 17 is a cross-section of a fuel rail illustrating a port injection fuel injector assembly in communication with the fuel rail.

As illustrated in FIGS. 16 and 17, the second rail bore 228 intersects at least one fuel injector cavity along the fuel rail length 34 at a cavity/second bore intersection 235. The cavity/second bore intersection 235 creates a cavity/second bore opening 236 wherein fuel travels from the fuel injector cavity 225 to the second rail bore 228. The first rail bore 229 intersects at least one fuel injector cavity 225 along the fuel rail length 34 at a cavity/first bore intersection 261. The cavity/first bore intersection 261 creates a cavity/first bore opening 262 wherein fuel travels from the first rail bore 229 to the fuel injector cavity 225.

As illustrated in FIG. 17, a cross-section of a fuel rail illustrating a port injection fuel injector assembly in communication with the fuel rail, at least one of at least one of port injection fuel injector assembly 31 and a port injection fuel injector 43 is placed into the fuel injector cavity 225. A first injector seal 263 provides sealed communication with a cavity wall 267 between the fuel rail second side 245 and the second rail bore 228. A second injector seal 265 provides sealed communication with the cavity wall 267 between the fuel rail first side 246 and the first rail bore 229. The combination of at least one of the substantially constant center line separation distance 234(d) throughout the fuel rail length 34, the cavity/first bore opening 262, cavity/second bore opening 236, and the positioning of at least one of at least one of port injection fuel injector assembly 31 and a port injection fuel injector 43 within the fuel injector cavity 225 provides for a counter-clockwise rotation 237 of the fuel within the fuel injector cavity 225 from the cavity/first bore opening 262 to the cavity/second bore opening 236. This counter-clockwise rotation 237 provides for a suctioning effect which draws the liquid fuel 115 out of the fuel injector cavity 225. Further, the counter-clockwise rotation draws the vaporized fuel 124 behind the liquid fuel 115. As previously illustrated, substantially constant center line separation distance 234(d) is defined by the separation width 286 and the separation height 288, wherein the relationship between the separation width 286 and the separation height 288 determines a correct substantially constant center line separation distance 234(d) of the for drawing the vaporized fuel 124 behind the liquid fuel 115. This ensures the system (2, 2', 2") contains liquid fuel 115 within the fuel infection cavity 225 and fuel rails 30 during ignition of the automobile. Thus, reducing the delay time to start the system (2, 2', 2") upon ignition, thus reducing the start time of the engine upon ignition as compared to the prior art which experiences delay due to vapor accumulation in the fuel injection cavity 225 and the fuel rails 30.

Maintenance of constant system bore diameter 290 from the fuel pump 100, to the service valves, lines (21, 23, 28, 35, 44, 138, 267, 140), the distribution block (27, 270, 275), fuel rails 30, and distribution block (27, 270, 275) to the fuel tank 4 is important to the system. The constant system bore diameter 290 determines a flow dynamic of fuel consumption. As a result, voids and cavities, which allow liquid to expand to vapor are substantially removed if not do not exist. The computer, during vehicle start up, sends a signal to deliver a fuel pump primer to purge the system.

An intended benefit of this invention is to provide an invention for a propane delivery system comprising a singular system for the distribution of liquid propane in in order to reduce the possibility of system failure and resulting EVAP emissions.

An intended benefit of the invention is to provide for the propane delivery system having a fuel pump which is accessible for maintenance without removing the fuel from the system and used to transfer fuel to and from remote tanks for servicing of remote tanks. It is observed tanks may be on a separate vehicle.

An intended benefit of the invention is to provide a propane fuel delivery system for distributing at least one of a proportional injection system and a direct injection system through a singular distribution assembly wherein the distribution assembly is equipped to monitor the temperature and/or pressure of the fuel advancing through the distribution assembly.

An intended benefit of the invention is to provide for a propane delivery system advancing liquid propane fuel and EVAP emissions of propane through the propane delivery system in order to reduce the start time of the engine upon ignition.

IL is recognized that at least one component of the fuel system first embodiment 2 is in conjunction with a; least one component of the fuel system second embodiment 2'.

It is recognized that at least one component of the fuel system first embodiment 2 is in conjunction with at least one component of the fuel system third embodiment 2".

It is recognized that at least one component of the fuel system second embodiment 2' is in conjunction with at least one component of the fuel system third embodiment 2".

IL is understood that at least one component of at least one of the first pump first position 135 and the first pump second position 135' is in conjunction with external pump assembly 137.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A liquid injected propane fuel system comprising:
a fuel tank,
a pump assembly located externally of said fuel tank, and
a fuel distribution block;
said pump assembly fluidly coupled between said fuel tank and said fuel distribution block;
said pump assembly further comprising:
a cylinder and a base tank valve adaptor;
said cylinder having a first end and an opposite second end and an internal cylinder wall, wherein said internal cylinder wall defines a cavity of said cylinder;
a pump positioned on said first end within said cavity;
said second end having a first opening for provision of a liquid propane fuel from said fuel tank;
said second end having a second opening for a disbursement of said liquid propane fuel from said pump assembly to said fuel distribution block without a phase change; and
said base tank valve adaptor in sealable and removable communication with said second end.

2. The liquid injected propane fuel system of claim 1, further comprising a bore extending through said internal cylinder wall fluidly coupled to a fuel line.

3. The liquid injected propane fuel system of claim 1, further comprising said base tank valve adaptor fluidly coupled to an overflow line, wherein said liquid propane fuel may be returned to said fuel tank.

* * * * *